United States Patent
Eckel et al.

(10) Patent No.: US 11,891,341 B2
(45) Date of Patent: *Feb. 6, 2024

(54) PRECERAMIC 3D-PRINTING MONOMER AND POLYMER FORMULATIONS

(71) Applicant: HRL Laboratories, LLC, Malibu, CA (US)

(72) Inventors: Zak C. Eckel, Thousand Oaks, CA (US); Andrew P. Nowak, Los Angeles, CA (US); Ashley M. Dustin, Los Angeles, CA (US); April R. Rodriguez, Santa Monica, CA (US); Phuong Bui, Thousand Oaks, CA (US); Tobias A. Schaedler, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/888,724

(22) Filed: May 30, 2020

(65) Prior Publication Data

US 2020/0290931 A1   Sep. 17, 2020

Related U.S. Application Data

(63) Continuation-in-part of application No. 15/822,199, filed on Nov. 26, 2017.

(60) Provisional application No. 62/556,388, filed on Sep. 9, 2017, provisional application No. 62/428,203, filed on Nov. 30, 2016, provisional application No. 62/428,213, filed on Nov. 30, 2016, provisional application No. 62/428,207, filed on Nov. 30, 2016.

(51) Int. Cl.
*C04B 35/571* (2006.01)
*B33Y 70/00* (2020.01)
*B33Y 80/00* (2015.01)
*C08G 77/50* (2006.01)
*B28B 1/00* (2006.01)

(52) U.S. Cl.
CPC ............ *C04B 35/571* (2013.01); *B28B 1/001* (2013.01); *B33Y 70/00* (2014.12); *B33Y 80/00* (2014.12); *C08G 77/50* (2013.01); *C04B 2235/5252* (2013.01); *C04B 2235/665* (2013.01)

(58) Field of Classification Search
CPC ............ C04B 35/571; C04B 2235/665; C04B 2235/5252; C04B 2235/6026; C04B 35/589; C04B 35/6269; C04B 2235/5436; C04B 35/5603; C04B 2235/3826; B28B 1/001; B33Y 70/00; B33Y 80/00; C09D 183/14

See application file for complete search history.

(56) References Cited

U.S. PATENT DOCUMENTS

| | | |
|---|---|---|
| 3,695,877 A | 10/1972 | Taneda et al. |
| 3,790,378 A | 2/1974 | Hayakawa et al. |
| 4,395,460 A | 7/1983 | Gaul |
| 4,575,330 A | 3/1986 | Hull |
| 4,816,497 A | 3/1989 | Lutz et al. |
| 5,001,090 A | 3/1991 | Schwark |
| 5,153,295 A | 10/1992 | Whitmarsh et al. |
| 5,698,485 A | 12/1997 | Bruck et al. |
| 6,573,020 B1 | 6/2003 | Hanemann et al. |
| 7,183,335 B2 | 2/2007 | Napadensky |
| 7,582,685 B2 | 9/2009 | Arney et al. |
| 7,964,248 B2 | 6/2011 | Fong et al. |
| 8,906,593 B1 | 12/2014 | Nowak et al. |
| 10,300,624 B2 | 5/2019 | Schmidt |
| 2002/0042491 A1 | 4/2002 | Brader et al. |
| 2006/0069176 A1 | 3/2006 | Bowman et al. |

(Continued)

FOREIGN PATENT DOCUMENTS

| | | |
|---|---|---|
| EP | 0442013 B1 | 6/1996 |
| WO | 2016044547 A1 | 3/2016 |

OTHER PUBLICATIONS

De Hazan et al. "SiC and SiOC ceramic articles produced by stereolithography of acrylate modified polycarbosilane systems" J. of the European Ceramic Society, 37, (2017), 5205-5212 (Year: 2017).*

(Continued)

*Primary Examiner* — Jessica M Roswell

(74) *Attorney, Agent, or Firm* — O'Connor & Company; Ryan P. O'Connor

(57) ABSTRACT

This disclosure provides resin formulations which may be used for 3D printing and thermally treating to produce a ceramic material. The disclosure provides direct, free-form 3D printing of a preceramic polymer, followed by converting the preceramic polymer to a 3D-printed ceramic composite with potentially complex 3D shapes. A wide variety of chemical compositions is disclosed, and several experimental examples are included to demonstrate reduction to practice. For example, preceramic resin formulations may contain a carbosilane in which there is at least one functional group selected from vinyl, allyl, ethynyl, unsubstituted or substituted alkyl, ester group, amine, hydroxyl, vinyl ether, vinyl ester, glycidyl, glycidyl ether, vinyl glycidyl ether, vinyl amide, vinyl triazine, vinyl isocyanurate, acrylate, methacrylate, alkacrylate, alkyl alkacrylate, phenyl, halide, thiol, cyano, cyanate, or thiocyanate. The resin formulations may contain a solid-phase filler, to provide high thermal stability and mechanical strength (e.g., fracture toughness) in the final ceramic material.

10 Claims, 10 Drawing Sheets

(56) References Cited

U.S. PATENT DOCUMENTS

| | | | |
|---|---|---|---|
| 2006/0165903 A1* | 7/2006 | Mazzanti | C04B 41/009 427/372.2 |
| 2006/0208388 A1 | 9/2006 | Bredt et al. | |
| 2007/0254975 A1* | 11/2007 | Arney | C08L 83/14 522/99 |
| 2008/0194721 A1 | 8/2008 | Arney et al. | |
| 2009/0148813 A1 | 6/2009 | Sun et al. | |
| 2010/0269721 A1 | 10/2010 | Takahashi et al. | |
| 2010/0279007 A1 | 11/2010 | Briselden et al. | |
| 2011/0033708 A1* | 2/2011 | Harimoto | B82Y 30/00 428/402 |
| 2011/0091722 A1* | 4/2011 | Koehne | B81C 1/00166 977/734 |
| 2012/0010066 A1* | 1/2012 | Fischer | A61K 6/887 501/32 |
| 2014/0131908 A1 | 5/2014 | Sun et al. | |
| 2014/0274658 A1* | 9/2014 | Sherwood | C08G 77/50 501/154 |
| 2016/0107331 A1 | 4/2016 | Schmidt | |
| 2016/0128909 A1 | 5/2016 | Fontein et al. | |
| 2016/0244625 A1 | 8/2016 | Clapp et al. | |
| 2016/0332382 A1 | 11/2016 | Coward et al. | |
| 2017/0204227 A1 | 7/2017 | Eckel | |
| 2018/0148585 A1 | 5/2018 | Eckel et al. | |

OTHER PUBLICATIONS

Tinuvin(R) 400 Technical Data Sheet, BASF (Year: 2019).*
Eckel et al., "Additive manufacturing of polymer-derived ceramics" Science, vol. 35, Issue 6268, pp. 58-62 + Supplementary Materials, Jan. 1, 2016.
Colombo et al., "Multifunctional advanced ceramics from preceramic polymers and nano-sized active fillers" Journal of the European Ceramic Society 33 (2013) 453-469.
Duan et al., "A review of absorption properties in silicon-based polymer derived ceramics" Journal of the European Ceramic Society 36 (2016) 3681-3689.
TB2: KiON® Ceraset® Polyureasilazane and KiON® Ceraset® Polysilazane 20, 2008.

* cited by examiner

PRECERAMIC 3D-PRINTING MONOMER AND POLYMER FORMULATIONS

PRIORITY DATA

This patent application is a continuation-in-part application of U.S. patent application Ser. No. 15/822,199, filed on Nov. 26, 2017, which claims priority to U.S. Provisional Patent App. No. 62/428,203, filed on Nov. 30, 2016; U.S. Provisional Patent App. No. 62/428,207, filed on Nov. 30, 2016; U.S. Provisional Patent App. No. 62/428,213, filed on Nov. 30, 2016, and U.S. Provisional Patent App. No. 62/556,388, filed on Sep. 9, 2017, each of which is hereby incorporated by reference herein.

FIELD OF THE INVENTION

The present invention generally relates to monomer formulations suitable for making preceramic polymers, which can be converted into ceramic matrix composites and other ceramic structures.

BACKGROUND OF THE INVENTION

Ceramic matrix composite (CMC) materials overcome many disadvantages of conventional ceramics, such as brittle failure, low fracture toughness, and limited thermal shock resistance. Applications of ceramic matrix composites include those requiring reliability at high temperatures (beyond the capability of metals or polymers) and resistance to corrosion and wear.

There is also high commercial demand for additively manufactured (3D-printed) ceramics in fields including industrial filtration (molten metal filters, flow separators); metal processing (casting molds/blanks); implantable dental and medical devices; and semiconductor processing. Additive manufacturing of ceramic materials is also of interest for propulsion components, thermal protection systems, porous burners, microelectromechanical systems, and electronic device packaging, for example.

No mature method for 3D printing ceramic matrix composites exists. Currently, CMC materials are limited to manual lay-up, molding, or thermoforming. There are also known techniques for sintering ceramic particles or using ceramic particles printed in a binder, both of which typically produce porous ceramics which have lower strength than the parent material. Ceramic structures are typically sintered as compacted porous materials, severely limiting the manufacturable geometries.

Formulations have been described for creating ceramic materials, which can be printed (additively manufactured) with various methods such as stereolithography techniques and laser sintering. These are typically unreinforced ceramics that do not contain a second phase and suffer from low fracture toughness. These methods are described in Zocca et al., "Additive Manufacturing of Ceramics: Issues, Potentialities, and Opportunities", *J. Am. Ceram. Soc.,* 98 [7] 1983-2001 (2015).

In addition, formulations which can create 1D or 2D ceramics, or very small 3D structures, have been described. See U.S. Pat. No. 4,816,497 issued Mar. 28, 1989 to Lutz et al.; U.S. Pat. No. 5,698,485 issued Dec. 16, 1997 to Bruck et al.; U.S. Pat. No. 6,573,020 issued Jun. 3, 2003 to Hanemann et al.; U.S. Pat. No. 7,582,685 issued Sep. 1, 2009 to Arney et al.; and U.S. Patent App. Pub. No. US2006/0069176A1 published Mar. 30, 2006 to Bowman et al.

In comparison with metals and polymers, ceramics are difficult to process, particularly into complex shapes. Because they cannot be cast or machined easily, ceramics are typically consolidated from powders by sintering or deposited in thin films. Flaws, such as porosity and inhomogeneity introduced during processing, govern the strength because the flaws initiate cracks, and—in contrast to metals—brittle ceramics have little ability to resist fracture. This processing challenge has limited the ability to take advantage of ceramics' impressive properties, including high-temperature capability, environmental resistance, and high strength. Recent advances in additive manufacturing have led to a multitude of different techniques, but all additive manufacturing techniques developed for ceramic materials only process unreinforced ceramics and not ceramic matrix composites. Only a few of the commercially available three-dimensional (3D) printing systems offer printing of ceramics, either by selective curing of a photosensitive resin that contains ceramic particles, selective deposition of a liquid binder agent onto ceramic particles (binder jetting), or selective fusion of a powder bed with a laser. All these techniques are limited by slow fabrication rates, and in many cases, a time-consuming binder removal process. By starting with powders that need to be consolidated to a dense part, it is an almost insurmountable challenge to add reinforcement and create ceramic matrix composites without fusing or reacting the matrix and the second phase, losing reinforcing capability. Furthermore, many additive processes introduce large thermal gradients that tend to cause cracks in ceramics. Pores, cracks, and inhomogeneities are often responsible for the low strength and poor reliability of additively manufactured ceramic parts.

Preceramic polymers are a class of polymers which allow, via a thermal treatment, a conversion of a polymer part to a ceramic material. Typically, these preceramic polymers contain silicon (Si) in the molecular backbone, with the resulting material containing Si. There are a wide variety of known preceramic polymers. Examples include polysilazanes, borazine-modified hydridopolysilazanes, polysilanes, polycarbosilanes, silicone resins, polyvinylborazine, polyborazylene, and decaborane-based polymers. These preceramic polymers have been used to form specific polymer-based structures that can be subsequently heat-treated (pyrolyzed or sintered) to create near net-shape ceramic structures.

A stereolithography technique provides a method to build a 3D polymer microstructure in a layer-by-layer process. This process usually involves a platform (e.g., substrate) that is lowered into a photomonomer bath in discrete steps. At each layer, a laser is used to scan over the area of the photomonomer that is to be cured (i.e., polymerized) for that particular layer. Once the layer is cured, the platform is lowered by a specific amount, determined by the processing parameters and desired feature/surface resolution, and the process is repeated until the complete 3D structure is created. One example of such a stereolithography technique is disclosed in U.S. Pat. No. 4,575,330 issued Mar. 11, 1986 to Hull et al.

Modifications to the above-described stereolithography technique have been developed to improve the polymer resolution by using laser optics and special resin formulations. Also, modifications have been made to decrease the fabrication time of the 3D polymer structure by using a dynamic pattern generator to cure an entire layer at once. One example of such a modification is disclosed in Bertsch et al., "Microstereo-lithography: A Review," *Materials Research Society Symposium Proceedings,* Vol. 758, 2003.

Another advancement to the standard stereolithography technique includes a two-photon polymerization process, as disclosed in Sun et al., "Two-Photon Polymerization And 3D Lithographic Microfabrication," *Advances in Polymer Science*, Vol. 170, 169-273, 2004.

There exists a need for creating ceramic parts of various sizes through 3D printing, for engineering and other applications. Lower-cost structures that are lightweight, strong, and stiff, but can withstand a high-temperature oxidizing environment, are sought. There is a desire for a method of direct 3D printing of ceramics reinforced with particles, whiskers, or fibers, also known as ceramic matrix composite structures.

SUMMARY OF THE INVENTION

The present invention addresses the aforementioned needs in the art, as will now be summarized and then further described in detail below.

Some variations provide a preceramic resin formulation for 3D-printing and free-radical or cationic polymerization, the preceramic resin formulation comprising:
(a) a functionalized carbosilane having the chemical structure:

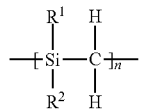

wherein:
R$^1$ is selected from the group consisting of hydrogen, a vinyl group, an allyl group, an ethynyl group, a C$_1$-C$_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, an alkacrylate group, an alkyl alkacrylate group, a phenyl group, a halide group, a thiol group, a thiol-containing group, a cyano group, a cyanate group, a thiocyanate group, and combinations thereof;
R$^2$ is selected from the group consisting of hydrogen (except when R$^1$ is hydrogen), a vinyl group, an allyl group, an ethynyl group, a C$_1$-C$_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, an alkacrylate group, an alkyl alkacrylate group, a phenyl group, a halide group, a thiol group, a thiol-containing group, a cyano group, a cyanate group, a thiocyanate group, and combinations thereof; and
n=1 to 100;
(b) a photoinitiator;
(c) optionally, a free-radical inhibitor; and
(d) optionally, a 3D-printing resolution agent.

In some embodiments of the preceramic resin formulation, one of R$^1$ or R$^2$ is hydrogen. In some embodiments, at least one of R$^1$ or R$^2$ is a vinyl group or an allyl group. In some embodiments, at least one of R$^1$ or R$^2$ is an acrylate group or a methacrylate group (or other alkacrylate group).

In some embodiments, at least one of R$^1$ or R$^2$ is a thiol group or a thiol-containing group.

The preceramic resin formulation may contain at least two distinct functionalized carbosilanes that are each in accordance with the chemical structure above, wherein R$^1$, R$^2$, and n are independently selected for the distinct functionalized carbosilanes.

The photoinitiator may be present in a concentration from about 0.001 wt % to about 10 wt % in the preceramic monomer formulation, for example.

In some embodiments, the photoinitiator generates free radicals by intramolecular bond cleavage or intermolecular hydrogen abstraction when exposed to light having a wavelength from about 200 nm to about 500 nm.

The photoinitiator may be selected from the group consisting of 2,2-dimethoxy-2-phenylacetophenone, 2-hydroxy-2-methylpropiophenone, camphorquinone, bis(2,4,6-trimethylbenzoyl)-phenylphosphineoxide, benzophenone, benzoyl peroxide, and combinations thereof, for example.

The free-radical inhibitor may be present in a concentration from about 0.001 wt % to about 10 wt % in the preceramic monomer formulation, for example.

The free-radical inhibitor may be selected from the group consisting of hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, and combinations thereof, for example.

The 3D-printing resolution agent may be present in a concentration from about 0.001 wt % to about 10 wt % in the preceramic resin formulation, for example.

The 3D-printing resolution agent may be selected from the group consisting of 2-(2-hydroxyphenyl)-benzotriazole, 2-hydroxyphenyl-benzophenones, 2-hydroxyphenyl-s-triazines, 2,2'-(2,5-thiophenediyl)bis(5-tert-butylbenzoxazole), 2,2'-(1,2-ethenediyl)bis(4,1-phenylene)bisbenzoxazole, and combinations thereof, for example.

In some embodiments, the preceramic monomer formulation further comprises a thermal free-radical initiator, such as (but not limited to) a thermal free-radical initiator selected from the group consisting of benzoyl peroxide, dicumyl peroxide, 2,2'-azobisisobutyronitrile, and combinations thereof.

In certain embodiments, the preceramic monomer formulation further comprises a radiation-trigger free-radical initiator active at a second wavelength that is substantially different from a first wavelength for which the photoinitiator is active.

The preceramic resin formulation may further contain a crosslinking agent, such as (but not limited to) a silazane.

In some embodiments, the preceramic monomer formulation further comprises from about 0.1 vol % to about 70 vol % of solid-phase fillers. Exemplary solid-phase fillers include, but are not limited to, Si, SiC, SiOC, SiCN, SiCBN, SiOCN, SiAlON, Si$_3$N$_4$, SiO$_2$, silicate glasses, zirconium hydride, and combinations thereof.

Some variations of the invention provide a preceramic polymer composition comprising functionalized polycarbosilane having the polymer structure:

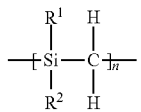

wherein:
- R¹ is selected from the group consisting of hydrogen, a vinyl group, an allyl group, an ethynyl group, a $C_1$-$C_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, an alkacrylate group, an alkyl alkacrylate group, a phenyl group, a halide group, a thiol group, a thiol-containing group, a cyano group, a cyanate group, a thiocyanate group, and combinations thereof;
- R² is selected from the group consisting of hydrogen (except when R¹ is hydrogen), a vinyl group, an allyl group, an ethynyl group, a $C_1$-$C_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, an alkacrylate group, an alkyl alkacrylate group, a phenyl group, a halide group, a thiol group, a thiol-containing group, a cyano group, a cyanate group, a thiocyanate group, and combinations thereof; and
- n=2 to 200, e.g. 5 to 100.

In some embodiments of the preceramic polymer composition, one of R¹ or R² is hydrogen.

The preceramic polymer composition may contain at least two distinct functionalized polycarbosilanes that are each in accordance with the above polymer structure, wherein R¹, R², and n are independently selected for the distinct functionalized polycarbosilanes.

In some embodiments, the preceramic polymer composition comprises a functionalized polycarbosilane copolymer having the copolymer structure:

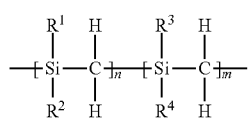

wherein:
- R¹, R², R³, and R⁴ are independently selected from the group consisting of hydrogen, a vinyl group, an allyl group, an ethynyl group, a $C_1$-$C_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, an alkacrylate group, an alkyl alkacrylate group, a phenyl group, a halide group, a thiol group, an alkylthiol group, a thiol-containing group, a cyano group, a cyanate group, a thiocyanate group, a mercaptopropionate group, a mercaptoactetate group, an aromatic group, and combinations thereof;
- at least one of R³ and R⁴ is different than R¹ or R²;
- n=1 to 200; and
- m=1 to 200.

In certain embodiments, the preceramic polymer composition comprises a functionalized polycarbosilane copolymer having the copolymer structure:

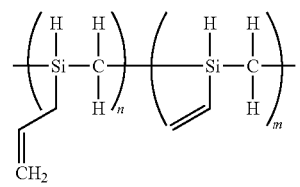

wherein R¹ is hydrogen, R² is an allyl group, R³ is hydrogen, and R⁴ is a vinyl group. The ratio of m to n may be from about 2 to about 20, for example.

In certain embodiments, the preceramic polymer composition comprises a functionalized polycarbosilane copolymer having the copolymer structure:

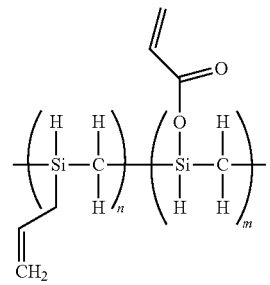

wherein R¹ is hydrogen, R² is an allyl group, R³ is an acrylate group, and R⁴ is hydrogen. The ratio of m to n may be from about 0.1 to about 10, for example.

In certain embodiments, the preceramic polymer composition comprises a functionalized polycarbosilane copolymer having the copolymer structure:

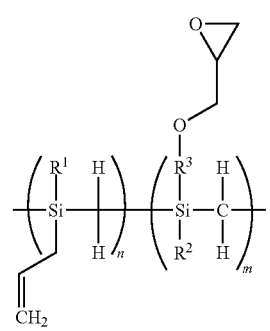

wherein R³ may be selected from $C_1$-$C_{18}$ unsubstituted or substituted alkyl groups. The ratio of m to n may be from about 0.1 to about 10, for example.

In certain embodiments, the preceramic polymer composition comprises a functionalized polycarbosilane copolymer having the copolymer structure:

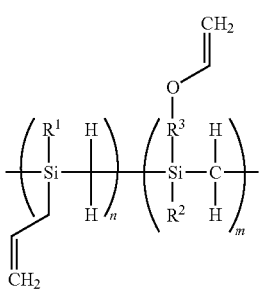

wherein R³ may be selected from $C_1$-$C_{18}$ unsubstituted or substituted alkyl groups. The ratio of m to n may be from about 0.1 to about 10, for example.

In certain embodiments, the preceramic polymer composition comprises a functionalized polycarbosilane copolymer having the copolymer structure:

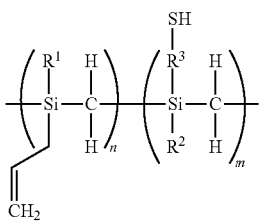

wherein R³ may be selected from $C_1$-$C_{18}$ unsubstituted or substituted alkyl groups. The ratio of m to n may be from about 0.1 to about 10, for example.

The preceramic polymer composition may further contain a crosslinking agent, such as (but not limited to) a silazane. In some embodiments, crosslinking agents may be monomers or oligomers of silanes with UV-reactive functional groups, such as vinyl, vinyl ether, acrylate, methacrylate, glycidyl, and/or glycidyl ether. Crosslinking agents may be used to improve the crosslink density of the polymers. In some cases, crosslinking agents reduce the resin viscosity.

In some embodiments, the preceramic polymer composition comprises copolymer repeat units that are different from the polycarbosilane repeat units. For example, the copolymer repeat units may be polycarbonitrosilane repeat units containing nitrogen bonded to silicon and/or carbon. In certain embodiments, the nitrogen is bonded to a functional group selected from the group consisting of hydrogen, a vinyl group, an allyl group, an ethynyl group, a $C_1$-$C_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, an alkacrylate group, an alkyl alkacrylate group, a phenyl group, a halide group, a thiol group, an alkylthiol group, a thiol-containing group, a cyano group, a cyanate group, a thiocyanate group, a mercaptopropionate group, a mercaptoactetate group, an aromatic group, and combinations thereof.

In some embodiments, the preceramic polymer composition further comprises from about 0.1 vol % to about 70 vol % of solid-phase fillers. Exemplary solid-phase fillers may be selected from the group consisting of Si, SiC, SiOC, SiCN, SiCBN, SiOCN, SiAlON, $Si_3N_4$, $SiO_2$, silicate glasses, zirconium hydride, and combinations thereof.

The preceramic polymer composition may be a 3D-printed polymer, which may be thermally treated to fabricate a 3D-printed ceramic part.

DETAILED DESCRIPTION OF EMBODIMENTS OF THE INVENTION

Figure 1A:
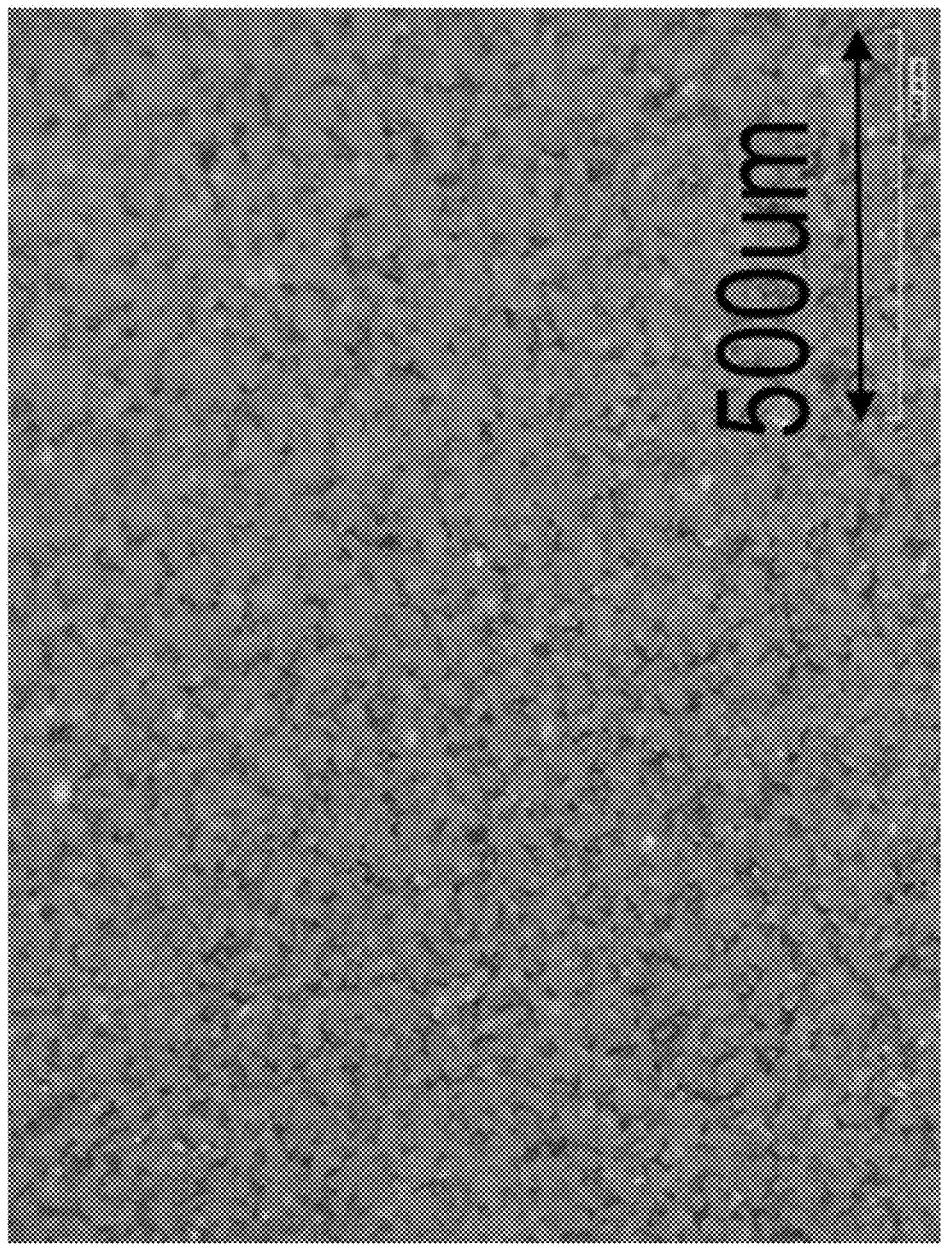
FIG. 1A is an optical microscope image of SiC solid-phase fillers dispersed in a preceramic silicone monomer (scale bar 500 μm), in Example 1.

The compositions (also referred to as formulations), structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Variations of this invention provide resin formulations which may be used for 3D printing (e.g., by stereolithography) of an intermediate structure followed by thermally treating (e.g., by firing or pyrolyzing) to convert the 3D intermediate structure into a 3D ceramic structure. The monomers and polymeric systems can be printed into potentially complex 3D shapes with high thermal stability and mechanical strength.

"Preceramic" in this disclosure simply refers to the capability to be ultimately converted to a ceramic material. It is noted that the disclosed preceramic resin formulations are precursors to preceramic polymers, which themselves are precursors to ceramic materials. As intended herein, a "resin" means a composition capable of being polymerized or cured, further polymerized or cured, or crosslinked. Resins may include monomers, oligomers, prepolymers, or mixtures thereof.

The extremely high melting point of many ceramics poses a challenge to additive manufacturing to make a 3D part, as compared with metals and polymers. Ceramics cannot be cast or machined easily. By contrast, the present methods enable geometrical flexibility. As described herein, preceramic resins that are cured with ultraviolet (UV) light in a stereolithography 3D printer or through a patterned mask, for example, form 1D, 2D, or 3D polymer structures that can have complex shape and cellular architecture. These polymer structures can then be thermally converted to the corresponding 1D, 2D, or 3D ceramic part, preferably with low shrinkage, or at least uniform shrinkage.

Some variations of the invention are premised on direct, free-form 3D printing of a preceramic polymer optionally loaded with a solid-phase filler, followed by converting the preceramic polymer to a 3D-printed ceramic matrix composite. The monomers and polymeric systems are selected with specific properties so that they can be printed using 3D-printing methods including stereolithography into complex 3D shapes. Some embodiments provide free-form ceramic matrix composite parts containing UV-cured, 3D-printed (e.g., stereolithographically), solid-filled preceramic Si-containing polymer resins, or related monomer formulations. As used herein, "polymer resin" means monomer, oligomer, prepolymer, or other molecule that is converted to a polymer.

The preceramic monomer formulations are designed to allow the ceramic structures to be formed with preferably high thermal stability (such as chemical and physical stability at temperatures greater than 1200° C.) and good mechanical strength (including stiffness, flexural strength, hardness, and/or fracture toughness). The solid solid-phase filler, among other benefits, can improve mechanical properties, especially the fracture toughness of the (otherwise) brittle ceramic material.

The invention in various embodiments applies to additively manufactured components, such as to reduce part count, scrap, or non-recurring engineering. Some embodiments apply to high-wear or high-temperature applications that would necessitate ceramic materials. Specific applications of interest include, for example, propulsion structures (vanes, impellors, nacelles, and thrusters), control surfaces (fins and leading edges), hypersonic structures (thermal protection systems and heat shields), high-wear components (brakes, clutches, and rotors), catalyst support structures (such as catalytic converters), pump components, filters, brakes, clutches, and space-exploration probes and vehicles.

This disclosure describes resin formulation families and methods for 3D printing of preceramic polymer parts with optional solid solid-phase fillers, and then firing or pyrolyzing the part into a ceramic. The ceramic materials may be prepared from a wide variety of preceramic monomer formulations that can be used in UV-cure-based 3D printing. Stereolithography, laser rastering, digital light processing, liquid crystal device projection, two-photon lithography, or other techniques may be employed to 3D print the monomer formulations.

In some variations, a monomer formulation is a mixture of a liquid preceramic monomer resin and a solid solid-phase filler. The liquid resin is preferably UV-curable to enable definition of three-dimensional shapes via a 3D-printing process.

Note that in this disclosure, all references to "UV," "UV-curable," "UV-cure-based" and the like shall include reference not only to ultraviolet radiation but also other electromagnetic radiation bands that can be effective in various embodiments, including microwave radiation, terahertz radiation, infrared radiation, visible radiation (light), ultraviolet radiation, and X-rays.

Some variations provide a preceramic resin formulation for 3D-printing and free-radical or cationic polymerization, the preceramic resin formulation comprising:

(a) a functionalized carbosilane having the chemical structure:

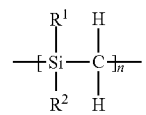

wherein:
R$^1$ is selected from the group consisting of hydrogen, a vinyl group, an allyl group, an ethynyl group, a C$_1$-C$_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, a methacrylate group, an alkacrylate group, an alkyl alkacrylate group, a phenyl group, a halide group, a thiol group, an alkylthiol group, a thiol-containing group, a cyano group, a cyanate group, a thiocyanate group, a mercaptopropionate group, a mercaptoacetate group, an aromatic group, and combinations thereof;

$R^2$ is selected from the group consisting of hydrogen (except when $R^1$ is hydrogen), a vinyl group, an allyl group, an ethynyl group, a $C_1$-$C_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, a methacrylate group, an alkacrylate group, an alkyl alkacrylate group, a phenyl group, a halide group, a thiol group, an alkylthiol group, a thiol-containing group, a cyano group, a cyanate group, a thiocyanate group, a mercaptopropionate group, a mercaptoacetate group, an aromatic group, and combinations thereof; and n=1 to 100;

(b) a photoinitiator (e.g., a photoinitiator that generates free radicals when exposed to light and/or a cationic photoinitiator);

(c) optionally, a free-radical inhibitor; and (d) optionally, a 3D-printing resolution agent.

Typically, at least one of $R^1$ and $R^2$ is not hydrogen, in which case the carbosilane is referred to as "functionalized carbosilane." In preferred embodiments, neither $R^1$ nor $R^2$ is hydrogen. In some embodiments of the preceramic resin formulation, one of $R^1$ or $R^2$ is hydrogen. In some embodiments, at least one of $R^1$ or $R^2$ is a vinyl group or an allyl group. In some embodiments, at least one of $R^1$ or $R^2$ is an acrylate group or a methacrylate group (or other alkacrylate group). In some embodiments, at least one of $R^1$ or $R^2$ is a thiol group or a thiol-containing group.

Note that in the overall carbosilane structure, there may be some repeat units that do not contain $R^1$, some repeat units that do not contain $R^2$, or some repeat units that do not contain either $R^1$ or $R^2$. In various embodiments, the fraction of repeat units that contain $R^1$ and $R^2$ may be at least 50%, 60%, 70%, 80%, 90%, 95%, 99%, or 100%.

When one of $R^1$ or $R^2$ is a $C_2$-$C_{18}$ unsubstituted or substituted group, there may be one or more C=C bonds and/or one or more CC bonds within the group. When there is one C=C bond, the R group is a diene; when there are two C=C bonds, the R group is a triene, and so on. A propargyl group may be present when $R^1$ or $R^2$ is a $C_3$-$C_{18}$ unsubstituted or substituted group, in which there is a terminal CC bond. Aromatic portions may be present, e.g. the R group may be or include a phenyl group (e.g., phenyl ethenyl, phenyl allyl, etc.). A $C_1$ or $C_2$ unsubstituted or substituted group is structurally linear, while a $C_3$-$C_{18}$ unsubstituted or substituted group may be linear, cyclic, or branched.

The repeat units of the carbosilane above may be arranged as linear repeat units, cyclic repeat units, branched repeat units, or a combination thereof. Branched repeat units themselves may be linear or cyclic. The molecule is depicted in a linear arrangement for convenience, without limitation. In some embodiments, the n repeat units are all connected linearly. In some embodiments with 3, the n repeat units are connected within a cyclic molecule. As intended herein, a "cyclic molecule" is a molecule within which there is at least one atomic ring that contains at least two Si—C bonds. In certain embodiments, some of the n repeat units are connected within a cyclic portion of the molecule, while other of the n repeat units are connected within a linear portion of the molecule.

In some embodiments, at least one of $R^1$ or $R^2$ is a UV-active functional group. As used herein, a "UV-active functional group" is a chemical group in the form of multiple atoms bonded together in a functional group that has absorption in the UV or visible region of electromagnetic radiation (wavelengths from about 100 nm to about 700 nm). Absorption (UV activity) occurs when a UV-active molecule absorbs ultraviolet or visible light that excites valence electrons, causing an electronic transition from a ground state to an excited state. UV absorption can be measured by a UV-visible spectrophotometer, which provides a spectrum of absorption versus wavelength. In some embodiments, a UV-active functional group selected from the group consisting of ethynyl, vinyl, allyl, acrylate, methacrylate, vinyl ether, epoxide, oxetane, thiol, thioketone, isothiocyanate, and combinations, analogues, or derivatives thereof that maintain UV activity.

The preceramic resin formulation may contain at least two distinct carbosilanes that are each in accordance with the chemical structure above, wherein $R^1$, $R^2$, and n are independently selected for the distinct carbosilanes.

The photoinitiator may be present in a concentration from about 0.001 wt % to about 10 wt % in the preceramic monomer formulation, for example.

In some embodiments, the photoinitiator generates free radicals by intramolecular bond cleavage or intermolecular hydrogen abstraction when exposed to light having a wavelength from about 200 nm to about 500 nm.

The photoinitiator may be selected from the group consisting of 2,2-dimethoxy-2-phenylacetophenone, 2-hydroxy-2-methylpropiophenone, camphorquinone, bis(2,4,6-trimethylbenzoyl)-phenylphosphineoxide, benzophenone, benzoyl peroxide, and combinations thereof, for example.

In some embodiments, the photoinitiator is a cationic photoinitiator, such as (but not limited to) sulphonium, iodonium, and/or ferrocenium cation paired with a non-nucleophilic anion. For example, the UV-curable resin may contain a salt which under light exposure creates acids (e.g., Brønsted acids) by cleavage of the sulphonium, iodonium, and/or ferrocenium cation of the onium salt, paired with a proton donor. Cationic photoinitiators are typically active under light wavelengths from 200 nm to 350 nm. Initiators that are active at lower or higher wavelengths are also applicable to these monomer formulations. Cationic photoinitiators may be used when the polymerization is, or includes, cationic polymerization. Different cationic photoinitiators or photoacid generators will generally result in different reaction rates for polymerization. A combination of different types of cationic photoinitiators (including ionic and non-ionic photoacid generators) may be used in the polymerization process.

Exemplary cationic photoinitiators include, but are not limited to, sulfonium, iodonium, and ferrocenium salts; cyclopentacienylcumene-iron hexafluoro phosphate; diphenyliodonium phosphate; triarylsulfonium hexafluoroantimonate; or a combination thereof. The cationic photoinitiator, when present, may be up to about 10 wt % of the monomer formulation. In various embodiments, the cationic photoinitiator is about 0.001, 0.005, 0.01, 0.05, 0.1, 0.5, 1, 2, 5, or 10 wt % of the monomer formulation.

A free-radical inhibitor may be present in a concentration from about 0.001 wt % to about 10 wt % in the preceramic monomer formulation, for example.

The free-radical inhibitor may be selected from the group consisting of hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, and combinations thereof, for example.

The 3D-printing resolution agent may be present in a concentration from about 0.001 wt % to about 10 wt % in the preceramic resin formulation, for example.

The 3D-printing resolution agent may be selected from the group consisting of 2-(2-hydroxyphenyl)-benzotriazole, 2-hydroxyphenyl-benzophenones, 2-hydroxyphenyl-s-triazines, 2,2'-(2,5-thiophenediyl)bis(5-tert-butylbenzoxazole), 2,2'-(1,2-ethenediyl)bis(4,1-phenylene)bisbenzoxazole, and combinations thereof, for example.

In some embodiments, the preceramic monomer formulation further comprises a thermal free-radical initiator, such as (but not limited to) a thermal free-radical initiator selected from the group consisting of benzoyl peroxide, dicumyl peroxide, 2,2'-azobisisobutyronitrile, and combinations thereof.

In certain embodiments, the preceramic monomer formulation further comprises a radiation-trigger free-radical initiator active at a second wavelength that is substantially different from a first wavelength for which the photoinitiator is active.

The preceramic resin formulation may further contain a crosslinking agent, such as (but not limited to) a silazane. In various embodiments, a crosslinking agent may be selected from the group consisting of monovinylsilanes, divinylsilanes, trivinylsilanes, tetravinyl silanes, (meth)acryloxypropyldimethyl methoxy silane, (meth)acryloxypropylmethyldimethoxy silane, dimethyldivinylsilane, 1,3-divinyl-1,1,3, 3-tetramethyldisilazane, 1,3,5,7-tetravinyl-1,3,5,7-tetramethylcyclotetrasilazane, 1,2,3,4,5,6,7,8-octamethylcyclotetrasilazane, and combinations thereof. In certain embodiments, crosslinking agents are monomers or oligomers of silanes and/or hydrocarbons with UV-reactive functional groups (e.g., vinyl, vinyl ether, (meth)acrylate, glycidyl, or glycidyl ether).

The preceramic monomer formulations may be loaded with a dissimilar solid material, or multiple solid materials, as solid-phase fillers to form polymer composite parts that can be directly converted to ceramic matrix composites (CMCs) via pyrolysis or other thermal treatment. The solid-phase fillers may include fibers, whiskers, platelets, particles, nanoparticles, nanotubes, or other forms of materials which can at least partially survive the pyrolysis conditions. Exemplary solid-phase fillers include, but are not limited to, carbides, oxides, nitrides, or carbon (such as diamond). Certain exemplary solid-phase fillers include, but are not limited to, Si, SiC, C, $Al_2O_3$, $SiO_2$, mullite ($Al_2O_3$—$SiO_2$), $Si_3N_4$, SiAlON, BN, and/or YAG ($Y_3Al_5O_{12}$).

In some embodiments, the preceramic monomer formulation comprises from about 0.1 vol % to about 70 vol % of solid-phase fillers. Exemplary solid-phase fillers include, but are not limited to, Si, SiC, SiOC, SiCN, SiCBN, SiOCN, SiAlON, $Si_3N_4$, $SiO_2$, silicate glasses, zirconium hydride, and combinations thereof.

The preceramic monomer formulation may further comprise one or more surface-active agents in the form of surfactants, such as dispersants, emulsifiers, or wetting agents that decrease the interfacial tension between the optional solid fillers and the liquid resin, facilitating mixing and dispersing the solids within the resin matrix. Surfactants may reduce settling and agglomeration of (optional) solid fillers to improve the uniformity, stability, and shelf life of the UV-curable resin.

Surfactants contain a mixture of hydrophobic and hydrophilic functional groups that provide simultaneous adsorption onto multiple types of surfaces. The hydrophobic functional groups may include, but are not limited to, hydrocarbon chains, fluorocarbon chains, siloxanes, or carbosilanes. The hydrophilic functional groups may have a range of compositions based on the polarity (e.g., nonionic, anionic, cationic, or zwitterionic). Examples of surfactants include, but are not limited to, carboxylates, sulfate esters, sulfonate esters, phosphates, quaternary ammonium salts, betaines, sultaines, ethoxylates, methoxysilanes, or a combination thereof. Multiple types of surfactants may be present.

The surfactant, when included in the preceramic monomer formulation, may be present in a concentration from about 0.001 wt % to about 15 wt % in the preceramic monomer formulation. In various embodiments, the surfactant is in a concentration of about 0.005, 0.01, 0.1, 0.5, 1, 2, 5, or 10 wt % of the preceramic monomer formulation.

Some variations of the invention provide a preceramic polymer composition comprising functionalized polycarbosilane having the polymer structure:

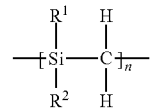

wherein:
$R^1$ is selected from the group consisting of hydrogen, a vinyl group, an allyl group, an ethynyl group, a $C_1$-$C_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, an alkacrylate group (e.g., methacrylate, ethacrylate, etc.), an alkyl alkacrylate group, a phenyl group, a halide group, a thiol group, an alkylthiol group, a thiol-containing group, a cyano group, a cyanate group, a thiocyanate group, a mercaptopropionate group, a mercaptoacetate group, an aromatic group, and combinations thereof;

$R^2$ is selected from the group consisting of hydrogen (except when $R^1$ is hydrogen), a vinyl group, an allyl group, an ethynyl group, a $C_1$-$C_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, a methacrylate group, an alkacrylate group, an alkyl alkacrylate group, a phenyl group, a halide group, a thiol group, an alkylthiol group, a thiol-containing group, a cyano group, a cyanate group, a thiocyanate group, a mercaptopropionate group, a mercaptoacetate group, an aromatic group, and combinations thereof; and n=2 to 200, e.g. 5 to 100.

The repeat units of the polycarbosilane above may be arranged as linear repeat units, cyclic repeat units, branched repeat units, or a combination thereof. Branched repeat units themselves may be linear or cyclic. The polymer is depicted in a linear arrangement for convenience, without limitation. In some embodiments, the n repeat units are all connected linearly. In some embodiments with 3, the n repeat units are connected within a cyclic polymer. In certain embodiments, some of the n repeat units are connected within a cyclic portion of the polymer, while other of the n repeat units are connected within a linear portion of the polymer.

Typically, at least one of $R^1$ and $R^2$ is not hydrogen. In preferred embodiments, neither $R^1$ nor $R^2$ is hydrogen. In some embodiments of the preceramic polymer composition, one of $R^1$ or $R^2$ is hydrogen.

Note that in the overall polycarbosilane structure, there may be some repeat units that do not contain $R^1$, some repeat units that do not contain $R^2$, or some repeat units that do not contain either $R^1$ or $R^2$. In various embodiments, the fraction of repeat units that contain $R^1$ and $R^2$ may be at least 50%, 60%, 70%, 80%, 90%, 95%, 99%, or 100%.

The preceramic polymer composition may contain at least two distinct polycarbosilane repeat units that are each in accordance with the above polymer structure, wherein $R^1$, $R^2$, and n are independently selected for the distinct polycarbosilane repeat units.

In some embodiments, the preceramic polymer composition comprises a polycarbosilane copolymer having the copolymer structure:

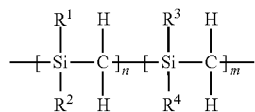

wherein:
$R^1$, $R^2$, $R^3$, and $R^4$ are independently selected from the group consisting of hydrogen, a vinyl group, an allyl group, an ethynyl group, a $C_1$-$C_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, an alkacrylate group, an alkyl alkacrylate group, a phenyl group, a halide group, a thiol group, a thiol-containing group, a cyano group, a cyanate group, a thiocyanate group, and combinations thereof;
at least one of $R^3$ and $R^4$ is different than $R^1$ or $R^2$;
n=1 to 200; and
m=1 to 200.

The copolymer is depicted in a linear arrangement for convenience, without limitation. In some embodiments, the n repeat units and m repeat units are all connected linearly. In some embodiments with n+m 3, there are repeat units connected within a cyclic copolymer. In certain embodiments, some of the repeat units are connected within a cyclic portion of the copolymer, while other repeat units are connected within a linear portion of the copolymer.

Also, the copolymer is depicted as a block copolymer; it will be understood that the copolymer may be an alternating copolymer or a random copolymer, for example. An alternating copolymer may contain single repeat units with $R^1$ and $R^2$ alternating with single repeat units containing $R^3$ and $R^4$, or may contain short blocks of repeat units containing $R^1$ and $R^2$ alternating with short blocks of repeat units containing $R^3$ and $R^4$, for example.

In certain embodiments, the preceramic polymer composition comprises a functionalized polycarbosilane copolymer having the copolymer structure:

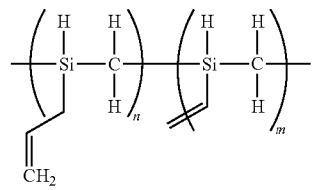

wherein $R^1$ is hydrogen, $R^2$ is an allyl group, $R^3$ is hydrogen, and $R^4$ is a vinyl group. The ratio of m to n may be from about 2 to about 20, for example.

Because an allyl group is a vinyl-containing group, a carbosilane polymer that is modified with vinyl groups and/or allyl groups may be referred to as a vinyl-functionalized polycarbosilane. In monomer form, a carbosilane molecule that is modified with vinyl groups and/or allyl groups may be referred to as a vinyl-functionalized carbosilane. An exemplary synthesis route for producing a vinyl-functionalized carbosilane or polycarbosilane includes reaction of halogenated silanes with vinyl Grignard reagents, allyl Grignard reagents, or a blend thereof, followed by reduction. See U.S. Pat. No. 5,153,295, issued to Whitmarsh et al. on Oct. 6, 1992, which is incorporated by reference herein.

In certain embodiments, the preceramic polymer composition comprises a functionalized polycarbosilane copolymer having the copolymer structure:

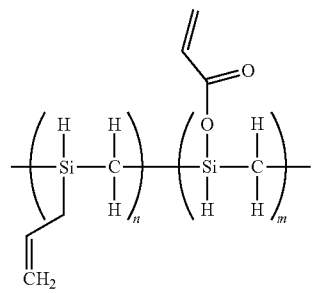

wherein $R^1$ is hydrogen, $R^2$ is an allyl group, $R^3$ is an acrylate group, and $R^4$ is hydrogen. The ratio of m to n may be from about 0.1 to about 10, for example.

A carbosilane polymer that is modified with acrylate groups and/or alkacrylate groups may be referred to as an acrylate-functionalized polycarbosilane. In monomer form, a carbosilane molecule that is modified with acrylate groups and/or alkacrylate groups may be referred to as an acrylate-functionalized carbosilane. An exemplary synthesis route for producing an acrylate-functionalized carbosilane or polycarbosilane involves oxidizing silyl hydride with acrylic acid or derivatives thereof.

In certain embodiments, the preceramic polymer composition comprises a functionalized polycarbosilane copolymer having the copolymer structure:

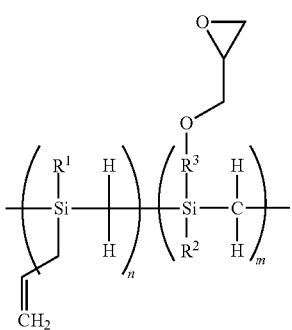

wherein $R^3$ may be selected from $C_1$-$C_{18}$ unsubstituted or substituted alkyl groups. The ratio of m to n may be from about 0.1 to about 10, for example.

In certain embodiments, the preceramic polymer composition comprises a functionalized polycarbosilane copolymer having the copolymer structure:

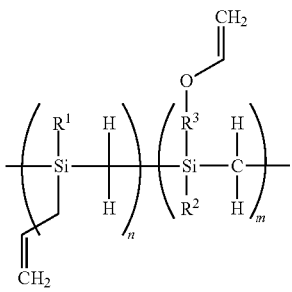

wherein $R^3$ may be selected from $C_1$-$C_{18}$ unsubstituted or substituted alkyl groups. The ratio of m to n may be from about 0.1 to about 10, for example.

In certain embodiments, the preceramic polymer composition comprises a functionalized polycarbosilane copolymer having the copolymer structure:

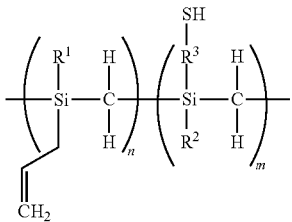

wherein $R^3$ may be selected from $C_1$-$C_{18}$ unsubstituted or substituted alkyl groups. The ratio of m to n may be from about 0.1 to about 10, for example.

A carbosilane polymer that is modified with thiol groups may be referred to as a thiol-functionalized polycarbosilane. In monomer form, a carbosilane molecule that is modified with thiol groups and may be referred to as a thiol-functionalized carbosilane. An exemplary synthesis route for producing a thiol-functionalized carbosilane or polycarbosilane involves reacting halogenated silanes with thiourea in aqueous base.

The preceramic polymer composition may further contain a crosslinking agent, such as (but not limited to) a silazane. In various embodiments, a crosslinking agent may be selected from the group consisting of monovinylsilanes, divinylsilanes, trivinylsilanes, tetravinyl silanes, (meth) acryloxypropyldimethyl methoxy silane, (meth)acryloxypropylmethyldimethoxy silane, dimethyldivinylsilane, 1,3-divinyl-1,1,3,3-tetramethyldisilazane, 1,3,5,7-tetravinyl-1,3,5,7-tetramethylcyclotetrasilazane, 1,2,3,4,5,6,7,8-octamethylcyclotetrasilazane, and combinations thereof.

In some embodiments, the preceramic polymer composition comprises copolymer repeat units that are different from the polycarbosilane repeat units. For example, the copolymer repeat units may be polycarbonitrosilane repeat units containing nitrogen bonded to silicon and/or carbon. In certain embodiments, the nitrogen is bonded to a functional group selected from the group consisting of hydrogen, a vinyl group, an allyl group, an ethynyl group, a $C_1$-$C_{18}$ unsubstituted or substituted alkyl group, an ester group, an amine group, a hydroxyl group, a vinyl ether group, a vinyl ester group, a glycidyl group, a glycidyl ether group, a vinyl glycidyl ether group, a vinyl amide group, a vinyl triazine group, a vinyl isocyanurate group, an acrylate group, an alkacrylate group, an alkyl alkacrylate group, a phenyl group, a halide group, a thiol group, a cyano group, a cyanate group, a thiocyanate group, and combinations thereof.

In some embodiments, the preceramic polymer composition further contains a photoinitiator that was present in the starting preceramic resin formulation and remains in the final polymer, in original or reacted form.

In some embodiments, the preceramic polymer composition further contains a free-radical inhibitor that was present in the starting preceramic resin formulation and remains in the final polymer, in original or reacted form.

In some embodiments, the preceramic polymer composition further contains a 3D-printing resolution agent that was present in the starting preceramic resin formulation and remains in the final polymer, in original or reacted form.

In some embodiments, the preceramic polymer composition further comprises from about 0.1 vol % to about 70 vol % of solid-phase fillers. Exemplary solid-phase fillers may be selected from the group consisting of Si, SiC, SiOC, SiCN, SiCBN, SiOCN, SiAlON, $Si_3N_4$, $SiO_2$, silicate glasses, zirconium hydride, and combinations thereof.

Various additives may be added to the preceramic polymer composition. For example, rheology modifiers (e.g., thickening or thinning agents) may be added. Exemplary rheology modifiers include silica, alumina, kaolin clay, carbon black, and polyphosphates.

Following pyrolysis, the ceramic material comprises interconnected three-dimensional ceramic matrix materials such as, but not limited to, silicon oxycarbide (SiOC), silicon carbide (SiC), silicon nitride ($Si_3N_4$), silicon oxynitride (SiON), silicon oxycarbonitride (SiOCN), silicon carbonitride (SiCN), silicon boronitride (SiBN), silicon boron carbonitride (SiBCN), boron nitride (BN), and/or silicon carbide-zirconium oxide composites (SiC/$ZrO_2$).

The preceramic polymer composition may be a 3D-printed polymer, which may be thermally treated to fabricate a 3D-printed ceramic part, as will be described in further detail later in this specification.

In some embodiments, the UV-curable monomer formulation comprises a first molecule containing two or more unsaturated C=X double bonds or C≡X triple bonds (or at least one C=X double bond and at least one C≡X triple bond). X is selected from C, S, O, N, or a combination thereof, so these functional groups include C=C double bond, CC triple bond, C=S, and C≡N. Any H atoms involved in these functional groups may be substituted with other atoms such as F or Cl, or side groups such as alkyl, ester, amine, hydroxyl, or CN. The first molecule may contain different combinations of these different unsaturated bonds. Typical unsaturated bonds are C=C double bonds at the terminal position of the molecules, in which three hydrogen atoms are bonded to carbon atoms on the C=C bonds (i.e., R—HC=CH$_2$ where R is the remainder of the first molecule). Other examples of these functional groups include allyl, vinyl, ethynyl, vinyl ether, vinyl ester, vinyl amide, vinyl triazine, vinyl isocyanurate, acrylate, methacrylate, diene, triene, or a mixture thereof.

In some embodiments, the first molecule also contains at least one non-carbon atom in the main chain or side chains of the first molecule. Examples of non-carbon atoms that may be used include, but are not limited to, Si, B, Al, Ti, Zn, O, N, P, S, Ge, and combinations thereof. The non-carbon atoms may be a part of cyclic or acyclic groups or structures within the first molecule. The non-carbon atoms are preferably not merely single non-carbon atoms ionically bonded at the end(s) of the first molecule. In some embodiments, when X is O, the non-carbon atom is not O; or when X is N, the non-carbon atom is not N.

Examples of the first molecules include, but are not limited to, trivinylborazine; 2,4,6-trimethyl-2,4,6-trivinylcyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyltriazatriphosphinine; tetraallyloxysilane; vinyl-terminated polydimethylsiloxane; tetravinylsilane; vinyl-terminated polydimethylsiloxane-ethylene copolymer; divinyldimethylsilane; 1,2-divinyltetramethyldisilane; 1,4-bis(vinyldimethylsilyl)benzene; vinylmethylsiloxane homopolymer; methacryloxypropyl-terminated polydimethylsiloxane; boron vinyldimethylsiloxide; vinylmethylsiloxane-dimethylsiloxane copolymer, trimethyl siloxy-terminated homopolymer; vinylethoxysiloxane-propylethoxysiloxane copolymer; vinyltrimethoxysilane; trivinylmethylsilane; diallyldimethylsilane; 1,3,5-trisilacyclohexane; B,B'B"-trithynyl-N,N'N"-trimethylborazine; B,B'B"-triethynylborazine; vinylmethoxysiloxane, acryloxypropyl(methylsiloxane) homopolymer; polycarbosilane; functionalized polycarbosilane; or a combination thereof.

The first molecule, when present, may be up to about 100 wt % of the monomer formulation. In various embodiments, the first molecule is about 5, 10, 20, 30, 40, 50, 60, 70, 80, 90, or 95 wt % of the monomer formulation.

In some embodiments, the UV-curable monomer formulation comprises a second molecule with a structure R—Y—H, wherein Y=O, S, N, or combinations thereof. The molecules R—Y—H can provide two or more YH groups for polymerization, and can be part of cyclic or acyclic structures. Typical YH groups are SH groups, e.g. thiol or mercapto groups. The R groups can be organic groups such as alkyl groups, ester groups, amine groups, or hydroxyl groups, or inorganic non-carbon-containing atoms or groups. Examples of inorganic non-carbon atoms or groups in the second molecule include, but are not limited to, Si, B, Al, Ti, Zn, P, Ge, S, O, N, or combinations thereof. The reaction rate varies depending on the different molecules utilized. In some preferred embodiments, a thiol is employed with at least half of the main chain made of inorganic atoms, such as silicon. Other atoms in the main chain may include oxygen, nitrogen, and/or carbon.

The second molecule, when present, may be up to about 97 wt % of the monomer formulation. In various embodiments, the second molecule is about 0, 5, 10, 20, 30, 40, 50, 60, 70, 80, or 90 wt % of the monomer formulation. The second molecule may be present whether or not the first molecule is present.

Exemplary second molecule include, but are not limited to, pentaerythritol tetrakis(3-mercaptopropionate); trimethylolpropanetris(2-mercaptoacetate); trimethylolpropane tris (3-mercaptopropionate); tetrakis(dimethyl-3-mercaptopropylsiloxy)silane; tetrakis(dimethyl-2-mercaptoacetate pylsiloxy)silane; (mercaptopropyl)methylsiloxane-dimethylsiloxane copolymer; (mercaptopropyl)methylsiloxane homopolymer; pentaerythritol tetrakis(2-mercaptoacetate), thiol-functionalized polycarbosilane; or a combination thereof.

In some embodiments, the UV-curable monomer formulation comprises a third molecule with a structure R—Y, wherein Y is selected from an aliphatic ether, a cyclic ether, a vinyl ether, an epoxy, a cycloaliphatic epoxy, an oxetane group, or a combination thereof. The R groups may be selected from organic groups such as alkyl groups, ester groups, amine groups, or hydroxyl groups, or inorganic non-carbon containing atoms or groups. Examples of inorganic non-carbon atoms or groups in the second molecule include, but are not limited to, Si, B, Al, Ti, Zn, P, Ge, S, O, N, or combinations thereof. The inorganic non-carbon atoms or groups may be a part of cyclic or acyclic structures.

Exemplary third molecules include, but are not limited to, epoxy-functional dimethylpolysiloxane and/or epoxycyclohexylethyl methylsiloxane/dimethylsiloxane. These monomers can be any portion of the monomer formulation.

In particular, the third molecule, when present, may be up to about 100 wt % of the monomer formulation. In various embodiments, the third molecule is about 5, 10, 20, 30, 40, 50, 60, 70, 80, 90, or 95 wt % of the monomer formulation. The third molecule may be present whether or not the first or second molecules are present.

In some embodiments, the UV-curable monomer formulation comprises a photoinitiator that generates free radicals under light exposure by intramolecular bond cleavage or intermolecular hydrogen abstraction. The photoinitiator may be active in the presence of light having a wavelength from about 200 nm to about 500 nm, for example. Photoinitiators may be used when the polymerization is, or includes, free-radical polymerization. Photoinitiators may be used to initiate polymerization when exposed to other wavelengths, such as in the visible spectrum. In certain embodiments, light exposure is produced from light having one or more wavelengths selected from about 200 nm to about 700 nm, such as about 250, 300, 350, 400, 500, or 600 nm.

Different photoinitiators will generally result in different reaction rates for polymerization. A combination of different types of photoinitiators may be used in the polymerization process. More than one photoinitiator may be included to allow multi-wavelength curing, for example.

Examples of photoinitiators include, but are not limited to, 2,2-dimethoxy-2-phenylacetophenone; 2-hydroxy-2-methylpropiophenone; camphorquinone; bis(2,4,6-trimethylbenzoyl)-phenylphosphineoxide; benzophenone; benzoyl peroxide; thioxanones; dicumyl peroxide; 2,2'-azobisisobutyronitrile; camphorquinone; oxygen; nitrogen dioxide; or a combination thereof.

The photoinitiator, when present, may be up to about 10 wt % of the monomer formulation. In various embodiments, the photoinitiator is about 0.001, 0.005, 0.01, 0.05, 0.1, 0.5, 1, 2, 5, or 10 wt % of the monomer formulation.

In some embodiments, the UV-curable monomer formulation comprises a free-radical inhibitor added in a sufficient amount to the monomer formulation to inhibit unwanted polymerization of regions outside the desired printing area. A free-radical inhibitor can improve resolution to the desired part in embodiments that employ free-radical polymerization. A free-radical inhibitor can also deter shadow curing, which is normally not desired. Additionally, a free-radical inhibitor can improve long-term stability of the formulation and keep reaction kinetic parameters constant over time.

Exemplary free-radical inhibitors include, but are not limited to, hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, or a combination thereof. When present, the free-radical inhibitor may be up to about 5 wt % of the monomer formulation, such as about 0.001, 0.005, 0.01, 0.05, 0.1, 0.2, 0.5, 1, or 2 wt % of the monomer formulation.

Optionally the formulation further includes a radiation-trigger free-radical initiator that is active at a wavelength substantially different from the photoinitiator. When the preceramic resin formulation includes a thermal free-radical initiator, optionally the formulation further includes a radiation-trigger free-radical initiator.

In some embodiments, the UV-curable monomer formulation comprises a free-radical thermal initiator that generates free radicals under elevated temperature conditions. The addition of a free-radical thermal initiator allows for multiple-mechanism curing in the formulation, i.e., both UV curing and thermal curing, or allows for a different polymerization reaction rate. One or a combination of different types of thermal initiators may be used in the polymerization process.

A thermal initiator may be used to crosslink unreacted vinyl groups remaining which have not reacted with the thiol group or to react the vinyl group with other available functional groups such as methyl or hydro groups on the first or second molecule, creating a second type of reaction mechanism. A thermal post-cure after 3D printing may be done, such as by heating the polymer structure up to 300° C.

Exemplary free-radical thermal initiators include, but are not limited to, benzoyl peroxide, dicumyl peroxide, 2,2'-azobisisobutyronitrile, or a combination thereof. When present, the free-radical thermal initiator may be up to about 10 wt % of the monomer formulation, such as about 0.001, 0.01, 0.1, 1, 2, or 5 wt % of the monomer formulation.

In some embodiments, the UV-curable monomer formulation comprises a photoinitiator that is a cationic photoinitiator or photoacid generator, such as (but not limited to) sulphonium, iodonium, and/or ferrocenium cation paired with a non-nucleophilic anion. For example, the UV-curable resin may contain a salt which under light exposure creates acids (e.g., Brønsted acids) by cleavage of the sulphonium, iodonium, and/or ferrocenium cation of the onium salt, paired with a proton donor. Cationic photoinitiators are typically active under light wavelengths from 200 nm to 350 nm. Initiators that are active at lower or higher wavelengths are also applicable to these monomer formulations. Ionic photoacid generators may be used when the polymerization is, or includes, cationic polymerization. Different cationic photoinitiators or photoacid generators will generally result in different reaction rates for polymerization. A combination of different types of cationic photoinitiators (including ionic and non-ionic photoacid generators) may be used in the polymerization process.

Exemplary cationic photoinitiators include, but are not limited to, sulfonium, iodonium, and ferrocenium salts; cyclopentacienylcumene-iron hexafluoro phosphate; diphenyliodonium phosphate; triarylsulfonium hexafluoroantimonate; or a combination thereof.

The cationic photoinitiator, when present, may be up to about 10 wt % of the monomer formulation. In various embodiments, the cationic photoinitiator is about 0.001, 0.005, 0.01, 0.05, 0.1, 0.5, 1, 2, 5, or 10 wt % of the monomer formulation.

In certain embodiments, the UV-curable monomer formulation comprises a hydrogen donor that may be used to assist in the generation of a Brønsted acid in the cation or in acceleration of anionic photoinitiator reactions, for example. Exemplary hydrogen donors include, but are not limited to, tertiary amines, alcohols, ethers, esters, water, or a combination thereof. When present, the hydrogen donor may be up to about 2 wt % of the monomer formulation, such as about 0.001, 0.005, 0.01, 0.05, 0.1, 0.5, 1, or 1.5 wt % of the monomer formulation.

In some embodiments, the UV-curable monomer formulation comprises a UV sensitizer that may be used to enable the long-UV-wavelength reaction of UV systems with photoinitiators which typically absorb at lower wavelengths. This is typically the case with cationic photoinitiators, which are generally limited to absorption up to about 325-375 nm, for example. UV sensitizers interact with UV light at higher wavelengths, generally into the 375-425 nm range, and then interact with the photoinitiator to create either free radicals and/or Brønsted acids. A UV sensitizer forms an excited triplet state under UV light absorption, and then via electron or energy transfer, reacts with a photoinitiator to generate free radicals and/or Brønsted acids. This initiates photopolymerizaton.

UV sensitizers may be selected from dibutoxyantracene, diethoxyanthracene, 1-chloro-4-propoxythioxanthone, 2-isopropylthioxanthone, 4-isopropylthioxanthone, or a combination thereof, for example. When present, the UV sensitizer may be up to about 5 wt % of the monomer formulation, such as about 0.001, 0.005, 0.01, 0.05, 0.1, 0.5, 1, 2, 3, or 4 wt % of the monomer formulation.

In some embodiments, including those utilizing free-radical polymerization, cationic polymerization, or both of these, the UV-curable monomer formulation comprises one or more 3D-printing resolution agents selected from UV absorbers, fluorescents, optical brighteners, or a combination thereof.

A "3D-printing resolution agent" is a compound that improves print quality and resolution by containing the curing to a desired region of the laser or light exposure. In certain embodiments, the 3D-printing resolution agent functions by absorbing light (e.g., UV or visible light) at a desired wavelength and converting the energy either into thermal energy or radiation at a higher wavelength. The use of 3D-printing resolution agents improves print quality and resolution by containing the curing by the laser or light exposure to the desired region laterally and/or vertically in the print bath.

Exemplary 3D-printing resolution agents include, but are not limited to, 2-(2-hydroxyphenyl)-benzotriazole; 2-hydroxyphenyl-benzophenones; 2-hydroxyphenyl-s-triazines; 2,2'-(2,5-thiophenediyl)bis(5-tert-butylbenzoxazole); ethenediyl)bis(4,1-phenylene)bisbenzoxazole; or a combination thereof. When present, the 3D-printing resolution agent may be up to about 10 wt % of the monomer formulation, such as about 0.001, 0.01, 0.1, 0.5, 1, 2, 3, 4, 5, 6, 7, 8, or 9 wt % of the monomer formulation.

Some variations provide a preceramic resin formulation comprising:

(a) a first molecule comprising two or more C═X double bonds, two or more C≡X triple bonds, or at least one C═X double bond and at least one C≡X triple bond, wherein X is selected from the group consisting of C, S, N, O, and combinations thereof, and wherein the first molecule further comprises at least one non-carbon atom selected from the group consisting of Si, B, Al, Ti, Zn, P, Ge, S, N, O, and combinations thereof;

(b) optionally a second molecule comprising R—Y—H, wherein R is an organic group or an inorganic group, and wherein Y is selected from the group consisting of S, N, O, and combinations thereof (Y is not yttrium in this specification);

(c) a photoinitiator and optionally a thermal free-radical initiator;

(d) a free-radical inhibitor; and (e) a 3D-printing resolution agent.

In some embodiments, the first molecule is present from about 3 wt % to about 97 wt % of the formulation, such as about 4, 5, 10, 15, 20, 25, 30, 35, 40, 45, 50, 55, 60, 65, 70, 75, 80, 85, 90, or 95 wt %, for example.

In some embodiments, the first molecule contains two or more C═X double bonds, and at least one of these double bonds is located at a terminal position of the first molecule. In some embodiments, the first molecule contains two or more C≡X triple bonds, and at least one of these triple bonds is located at a terminal position of the first molecule. In some embodiments, the first molecule contains at least one C═X double bond and at least one C≡X triple bond, and the C═X double bond is located at a terminal position, or the C≡X triple bond is located at a terminal position, or both of the C═X double bond and the C≡X triple bond are located at (different) terminal positions within the first molecule. Note that a molecule may contain more than two terminal positions, when there is branching present.

In the first molecule, the non-carbon atom may be present in the main chain, in side chains, or in both of these.

The first molecule may include one or more functional groups selected from the group consisting of vinyl, ethynyl, vinyl ether, vinyl ester, vinyl amide, vinyl triazine, vinyl isocyanurate, acrylate, methacrylate, diene, triene, and analogues thereof. In some embodiments, the first molecule includes two or more of such functional groups. An "analogue" herein means that the functional group has similar chemical and reactive properties, with respect to the polymerization of the preceramic resin formulation.

In some embodiments in which the second molecule is included in the preceramic resin formulation, the second molecule is present from about 0.1 wt % to about 97 wt % of the formulation, such as about 0.2, 0.5, 1, 2, 3, 4, 5, 10, 15, 20, 25, 30, 35, 40, 45, 50, 55, 60, 65, 70, 75, 80, 85, 90, or 95 wt %, for example.

The second molecule may include one or more functional groups selected from the group consisting of thiol, alkyl, ester, amine, hydroxyl, and functional analogs thereof. Alternatively, or additionally, the second molecule may be chemically contained within one or more functional groups selected from the group consisting of thiol, alkyl, ester, amine, hydroxyl, and analogues thereof.

When the second molecule is present, the R group may be, or include, an inorganic group containing an element selected from the group consisting of Si, B, Al, Ti, Zn, P, Ge, S, N, O, and combinations thereof.

In some embodiments, at least 5%, 10%, 15%, 20%, 25%, 30%, 35%, 40%, 45%, or 50% (mole percent) of the R group is inorganic, i.e. not carbon. In certain embodiments, at least 5%, 10%, 15%, 20%, 25%, 30%, 35%, 40%, 45%, or 50% (mole percent) of the R group is specifically Si.

In the second molecule, the R group may be present in the main chain, in side chains, or in both of these. The non-carbon atom of the R group, when it is inorganic, may be the same as or different than the non-carbon atom in the first molecule.

The weight ratio of the second molecule to the first molecule may vary from about 0 to about 32, such as about 0.5, 1, 2, 3, 5, 10, 15, 20, 25, or 30. In some embodiments, the weight ratio of second molecule to first molecule is dependent on the ratio of thiol to vinyl. For example, in certain embodiments there is at least one thiol functional group available per vinyl group.

As noted earlier, some variations of the invention employ a combination of free-radical polymerization and cationic polymerization. In some embodiments, a preceramic monomer formulation compatible with stereolithography or UV-cure 3D printing leverages both cationic and free-radical polymerization mechanisms, wherein the formulation comprises:

(a) a first molecule comprising two or more C═X double bonds or C≡X triple bonds, wherein X is selected from C and/or S, or from C, S, O, and/or N, and wherein the first molecule further comprises at least one non-carbon atom in the main chain or side chains selected from the group consisting of Si, B, Al, Ti, Zn, P, S, Ge, and combinations thereof;

(b) a second molecule comprising two or more thiol or mercapto (SH) groups, wherein the second molecule further comprises at least one non-carbon atom in the main chain or side chains selected from the group consisting of Si, B, Al, Ti, Zn, P, S Ge, and combinations thereof (preferably at least 10 wt %, more preferably at least 40 wt %, of the non-carbon atoms being inorganic, such as Si), and wherein the second molecule may be a part of an alkyl group, ester group, amine group, or hydroxy group;

(c) a third molecule comprising two or more functional groups selected from aliphatic ether, cyclic ether, vinyl ether, epoxy, cycloaliphatic epoxy, oxetane, or a combination thereof, wherein the third molecule further contains at least one non-carbon atom in the main chain or side chains selected from the group consisting of Si, B, Al, Ti, Zn, P, S, Ge, and combinations thereof;

(d) a photoinitiator that generates free radicals by intramolecular bond cleavage and/or intermolecular hydrogen abstraction under exposure to light having a wavelength from about 200 nm to about 500 nm;

(e) a cationic photoinitiator or photoacid generator that may generate Brønsted acids under a light exposure;

(f) a free-radical inhibitor, wherein the free-radical inhibitor is added in a sufficient amount to the monomer formulation to inhibit unwanted polymerization of regions outside the desired exposure and deter shadow curing;

(g) UV absorbers, fluorescents, and/or optical brighteners added in a sufficient amount to the monomer formulation to improve print quality and resolution by containing the curing to the region of the laser or light exposure to the desired region;

(h) optionally a UV sensitizer to enable the long-UV-wavelength reaction of UV systems with photoinitiators that typically absorb at lower wavelengths, forming an excited triplet state under UV light absorption, followed by electron or energy transfer to react with a photoinitiator to generate free radicals and/or Brønsted acids, thereby initiating photopolymerizaton; and (i) optionally from about 0.1 vol % to about 70 vol % of one or more solid-phase fillers as set forth herein.

In preferred embodiments, the UV-curable monomer formulation further comprises one or more solid-phase fillers. A "solid-phase filler" as meant herein is a material that (a) forms at least one solid phase at 25° C. and 1 bar, and (b) enhances at least one chemical, physical, mechanical, or electrical property within the UV-curable monomer formulation or a reaction product thereof. A solid-phase filler is not merely a low-cost, diluent material (known also as extenders) but rather an important component of some formulations disclosed herein.

The solid-phase filler may be from about 0.1 vol % or about 1 vol % to about 70 vol % of the monomer formulation, with the majority of the remainder typically being liquid-phase UV-curable monomer.

The geometric shape of the solid-phase filler may be fibers including short fibers (1-100 micrometers in length) or long fibers (>100 micrometers in length), whiskers, nanotubes, nanorods, flat platelets, microparticles with diameters between 1 and 100 micrometers, nanoparticles with diameters between 1 and 1000 nanometers, or a combination thereof.

Particle sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images. Finally, sieving is a conventional technique of identifying particles by size.

To increase fracture toughness of a 3D-printed part, solid-phase fillers with aspect ratios of at least 2 are preferred, such as fibers, whiskers, nanotubes, and nanorods. Here, "aspect ratio" is the ratio of average length to average width, or in the case of an arbitrary shape, the ratio of average maximum length scale to average minimum length scale. The solid-phase filler aspect ratio is preferably at least 5, more preferably at least 10, in certain embodiments.

The solid-phase filler composition is preferably stable at a pyrolysis temperature of at least 800° C., so as not to disintegrate, melt, or vaporize during later conversion of a preceramic polymer to a ceramic material. Note that the solid-phase filler may react at pyrolysis temperatures with other components present in the monomer formulation or its reaction products (e.g., polymer) or with furnace atmosphere gases. It is possible for a portion of the solid-phase filler to react away into the vapor phase, or into a liquid phase, during high-temperature processing.

In certain embodiments, a solid-phase filler precursor is introduced to the monomer formulation, wherein the precursor is in a liquid phase or is a gel, for example. The solid-phase filler precursor may then react or undergo a phase change, such as during polymerization, to convert the solid-phase filler precursor into a solid-phase filler.

The solid-phase filler may have a wide range of compositions. For example, solid-phase filler compositions may include, but are not limited to, silicon-based ceramics such as SiOC, $SiO_2$, SiCN, SiC, SiCBN, SiOCN, $Si_3N_4$, silicate glasses, etc. Solid-phase filler compositions may include non-silicon-based ceramics such as metal oxides, e.g. $Al_2O_3$, $ZrO_2$, $TiO_2$, or $Y_3Al_5O_{12}$. Solid-phase filler compositions may include carbon-based, high-temperature materials such as carbon, graphene, diamond, and metal carbides, e.g. TiC, ZrC, HfC, or $B_4C$. Solid-phase filler compositions may include nitride-based ceramics, e.g. BN, TiN, ZrN, or AlN.

Solid-phase fillers interact with UV light according to Snell's law and the well-known Fresnel equations. These laws of physics determine the fractions of the light that are reflected, transmitted, or absorbed when UV light passes from resin to filler. For a UV-based 3D printing process, it is preferred that the fillers do not absorb too much UV light which would hinder complete UV curing of the resin. To avoid absorption of too much UV light, a low level of solid-phase filler may be employed, such as less than 10 vol % of relatively small (e.g., 10 micron or smaller) particles. Alternatively, or additionally, a solid-phase filler that is somewhat transparent to UV light and lets UV light pass through, may be employed. Another approach to ensure that UV light is not excessively absorbed by the filler particles is to employ particles with a surface that reflects UV light. For example, aluminum reflects UV light well. For maximum reflection, the surface of such particle should be smooth. Surface treatments or coatings may be applied to render the surface of filler particles reflective—such as a thin coating of aluminum or silver.

Preferred solid-phase filler materials, in some embodiments, are short fibers of alumina ($Al_2O_3$), quartz ($SiO_2$), glass, silicon nitride ($Si_3N_4$), yttrium aluminum garnet (YAG), or boron nitride (BN) because these materials transmit at least some UV light. SiC or C fibers absorb too much UV light and therefore should to be coated with a reflective coating, to enable efficient 3D printing.

Depending on the chemistry and viscosity of the monomer formulation (resin), the solid-phase filler may be treated to increase its compatibility with and wetting of the resin, the solubility and dispersion of the filler in the resin, and/or the bonding between the filler and the resin. In some embodiments, dispersion aides may be chosen to match the isoelectric point of the solid-phase filler particle and the chemistry and functionality of the monomer resin.

Some embodiments employ surfactants with a component which bonds to the surface of the filler and a component which solvates in the resin system. Surface functionality may be added to the surface of the solid-phase filler by covalently bonding a functional group to the surface of the filler. Examples include the use of silane surface modifiers with active groups that can either react with the chemistry of the resin or increase the wettability and dispersability in the solid-phase filler. These include the addition of mercapto trimethoxy silane, vinyl trimethoxy silane, 3-glycidyl oxypropyl trimethoxy silane, or a combination thereof, for example. The surface may also be modified through other chemical means, such as vapor-solid reactions or liquid-solid reactions, e.g. oxidation in a furnace or acid or base treatments.

For the 3D printing and curing of the resin, it can also be advantageous if the solid-phase filler itself is coated or surface-treated with a chemical that contains a functional group that aids in polymerization or crosslinking of the resin on UV and/or thermal exposure. Such functional groups include unsaturated ethers, vinyls, acrylates, methacrylates, cyclic ethers, epoxies, oxetanes, amines, hydroxyls, isocyanates, hydrides, or combinations thereof. By adding functional groups to the surface of the solid-phase filler, fewer or even no functional groups are necessary in the resin and the system can still be cured by UV exposure. Alternatively, or additionally, functional groups introduced to the surface of the solid-phase filler particles may enable a thermal cure after initial UV curing during 3D printing.

The solid-phase filler may be coated to protect it from environmental degradation during pyrolysis. Reactive species such as oxygen free radicals, and other free radicals, may be generated during the pyrolysis. Such free radicals can react with the fillers and degrade their properties. To mitigate this, the fillers may be coated with a thin layer of a protective material such as BN or a sacrificial material such as pyrolytic carbon that preferentially decomposes during pyrolysis.

To increase fracture toughness of a 3D-printed ceramic matrix composite, a high-aspect-ratio filler, such as a fiber, may be coated with a filler/matrix interfacial coating. The purpose of this coating is to provide a weak filler—matrix interface that prevents matrix cracks from penetrating the fillers—thus providing damage tolerance (toughness) to the composite. The interfacial coating is preferably chemically and mechanically stable during processing and pyrolysis. Examples of interfacial coatings include BN, C, AlN, or a combination thereof.

The formulations disclosed herein may be 3D printed using many different methods. In some variations, the formulations may be directly 3D printed and converted to free-form ceramic matrix composite structures. A 3D-printed preceramic polymer material may be prepared directly from preceramic monomer formulations, with no intervening steps being necessary. A 3D-printed ceramic material may then be prepared directly from the 3D-printed preceramic polymer material, with no intervening steps being necessary.

Preferred methods may include stereolithography, binder jetting, resin jetting with fiber placement, polyjetting, extrusion printing, or a combination thereof.

In stereolithography, the solid-phase filler is dispersed in the liquid resin (monomer formulation). Layers are cured from the top or bottom using UV-laser rastering, projection micro-stereolithography, digital light projection, or liquid crystal device projection, for example. Smaller filler sizes are preferred since the filler size often limits the resolution, depending on material choice.

Generally speaking, "jetting" of a material means that droplets of a build material are selectively deposited onto a build bed to develop a three-dimensional object. Jetting can be carried out by liquid deposition, vapor deposition, or liquid-vapor mist deposition, for example, via spraying (such as via a nozzle in communication with a material under pressure), impingement (such as via a tube or pipe in communication with a material that is pumped), or other means.

In binder jetting, a layer of the solid-phase filler is spread out and resin (monomer formulation) is jetted on selected locations and cured such as via UV light or thermally. This process is similar to conventional binder jetting methods, but instead of a binder, a preceramic monomer formulation is used. The solid-phase filler may initially be spread out on a substrate or on a region of polymer based on the selected monomer, for example. After an initial step of binder jetting, another layer of the solid-phase filler may be spread out on a 3D-printed polymer layer, followed by resin jetting and curing. This process may be repeated many times for large parts.

In resin jetting with fiber placement, solid-phase fillers in the form of long or short fibers are placed in the preferred location and aligned in the preferred direction. Subsequently, preceramic resin (monomer formulation) is jetted in selected locations and cured. The process is repeated layer-by-layer to build a part. Resin jetting with fiber placement enables printing of parts with high volume fraction (such as 30-60 vol %) of aligned fibers, resulting in improved mechanical properties for the final ceramic structure (following pyrolysis).

In polyjetting, a mixture of liquid resin (monomer formulation) and solid-phase filler is jetted and written into the desired pattern. As the mixture is dispensed, it is exposed to UV light such as a laser, LED, or plasma sources, and cured into a polymer. Multiple mixtures are able to be dispensed through different nozzles, allowing for more than one type of monomer-filler mixture to be utilized simultaneously. This results in tailored mechanical properties for the final ceramic structure (following pyrolysis).

In extrusion printing, the resin and filler mixture is squeezed through a micro-nozzle, or multiple micro-nozzles, and cured via UV light. One advantage is that high-aspect-ratio fillers can be aligned with the extrusion process. Alignment generally improves mechanical properties in the aligned direction.

After a part is 3D printed using any of the above methods, or another method, the part may be post-cured. An optional thermal post-cure of the 3D polymer is performed after the 3D printing but prior to the pyrolysis to produce the ceramic structure. A post-cure step may be employed to crosslink unreacted functional groups, for example. Post-curing may be accomplished by additional UV exposure and/or a thermal post-cure at elevated temperatures (such as 60-500° C.) in an oven for about 10 minutes to about 8 hours. When a thermal post-cure is to be done, it can be beneficial to include a thermal initiator in the initial 3D-printing composition, to facilitate later thermal curing.

Typically, but not necessarily, a monomer formulation is conveyed (printed) to a region of interest, such as via stereolithography, binder jetting, resin jetting with fiber placement, polyjetting, or extrusion printing, either followed by polymerization or with polymerization taking place simultaneously with the printing. Preferably, the polymerizing and 3D printing steps are performed simultaneously, at a desired location (e.g., a layer) within a part. In some embodiments, the polymerizing and 3D printing steps are performed semi-simultaneously, in which multiple steps are performed overall while at each step, some amount of polymerizing and some amount of 3D printing takes place. It is also possible, in some embodiments, to first polymerize a preceramic resin formulation, followed by 3D printing of the already-made polymer—especially when the polymer is a thermoplastic material.

In some embodiments, the curing or conversion of preceramic resin formulation to preceramic polymer includes crosslinking. A crosslink is a bond that links one polymer chain to another. Crosslink bonds can be covalent bonds or ionic bonds. When polymer chains are linked together by crosslinks, they lose some of their ability to move as individual polymer chains. Crosslinks are the characteristic property of thermosetting plastic materials. In most cases, crosslinking is irreversible, unless ionic bonds are employed in reversible crosslinks (see, for example, commonly owned U.S. patent application Ser. No. 15/391,749, filed Dec. 27, 2016, which is hereby incorporated by reference herein).

In some embodiments, while a monomer is being converted to polymer, a gel is formed first. Gel formation is followed by formation of a solid material as the monomer conversion is further increased, to crosslink chains together. A "gel" is a solid, jelly-like material that can have properties ranging from soft and weak to hard and tough. Gels exhibit no flow when in the steady-state. By weight, gels are mostly liquid, yet they behave like solids due to a three-dimensional crosslinked network within the liquid.

Some variations of the invention utilize a self-propagating polymer waveguide, as described in commonly owned U.S. Pat. No. 7,687,132 issued Mar. 30, 2010 to Gross et al.; U.S. Pat. No. 9,341,775 issued May 17, 2016 to Eckel et al.; U.S. Pat. No. 9,377,567 issued Jun. 28, 2016 to Jacobsen et al.; and U.S. Pat. No. 9,528,776 issued Dec. 27, 2016 to Roper et al., which are hereby incorporated by reference herein. Without being limited by speculation or theory, it is hypothesized that initial exposure of monomer to a collimated beam can initiate microgel sites within the liquid monomer layer. These microgel sites have a higher crosslink density than the surrounding monomer/polymer, which leads to a higher localized refractive index. The higher refractive index at the microgel site may act as a lens. The focused energy from the incident beam leads to initial "waveguide" formation in the direction of the incident (primary) beam, where the refractive index of the waveguide is higher than the surrounding monomer/polymer. U.S. Pat. No. 7,382,959 issued Jun. 3, 2008 to Jacobsen is hereby incorporated by reference herein for its description of mechanisms involving self-propagating polymer waveguide formation.

In exemplary embodiments, sufficient polymerization inhibitor and UV absorber are added to the resin formulation to confine the polymerization to the laser exposure point and to minimize scatter, thus maintaining fidelity in the features of the printed part. UV light is then scanned across the resin surface to expose a cross section and build up a thin slice of the part to be manufactured. Although in principle any geometry can be fabricated with this approach, the process can be slow, because every thin layer has to be exposed separately.

Structures with linear features extending from the exposure surface, such as lattices and honeycombs, can be formed much more rapidly when utilizing the self-propagating photopolymer waveguide technology. Monomers are selected to promote a change in the index of refraction upon polymerization, which causes internal reflection of the UV light, trapping it in the already-formed polymer. This exploits a self-focusing effect that forms a polymer waveguide, tunneling the light toward the tip of the waveguide and causing it to polymerize further. There is a reduced need for additives that control scatter and UV absorption. The architecture of the material or structure can then be defined by a patterned mask that defines the areas exposed to a collimated UV light source, for example. The polymer crosslink density depends on exposure parameters and can be increased by thermal treatments or additional UV exposure. Unpolymerized resin may be recycled and reused.

The direct, near-net-shape conversion of a preceramic 3D-printed polymer to a ceramic structure may be achieved by pyrolysis or other thermal treatment, such as (but not limited to) sintering, annealing, or calcination. Typically, the thermal treatment is based on heating the 3D-printed structure for an extended period of time (such as from 10 minutes to 1 week) under various inert or reactive atmospheres.

Thermal treatment may be done for an extended period of time under various atmospheres, including but not limited to $N_2$, Ar, He, air, $CO_2$, $CH_4$, $C_2H_6$, $C_2H_4$, $NH_3$, or a combination thereof. Treatment pressures may vary from about 1 atm to about 20 atm, for example. Vacuum pyrolysis may also be employed, in which the treatment pressure is less than 1 atm, again under various atmospheres as noted above.

The pyrolysis or other thermal treatment may include heating at a heating rate of 0.1-20° C./min from ambient temperature to an elevated temperature from about 500° C. to about 1500° C., such as from about 800° C. to about 1100° C. These slow heating rates are preferred to enable evolving gases to escape, thereby minimizing porosity in the final part. When porosity is desired, higher heating rates (e.g., higher than 20° C./min) may be employed. The pyrolysis or other thermal treatment may also include dwelling at the elevated temperature (e.g., 950° C.) for at least 1, 5, 10, 15, 30, or 60 minutes. Following pyrolysis, the material may be cooled at a cooling rate (magnitude) of 0.1-20° C./min back to ambient temperature. In some embodiments, faster cooling (e.g., higher than 20° C./min in magnitude) is desired to freeze-in a desired microstructure, for example.

The thermal treatment is preferably performed following polymerization and any (optional) thermal post-cure of the 3D polymer. In certain embodiments, the thermal treatment is combined (i.e., overlaps in time and/or temperature) with polymerization, thermal post-cure, or both. It will also be recognized that even when a sequential operation is intended, some amount of ceramic formation may occur prior to a planned step of thermal treatment, as a result of the intrinsic kinetics and thermodynamics of the reaction system.

In some embodiments, a reactive thermal treatment is performed, in which the gas that is initially present is reactive toward the initial polymer, the final ceramic material, or both of these. When the gas is reactive, it may react with a component and cause it to leave the material. Alternatively, or additionally, the gas may react with a component and remain with the base material. It is also possible for the gas to react and form products, some of which depart from the material while the rest remains with the material. Reactive gases may be selected from $O_2$, $O_3$, air, CO, $CO_2$, $H_2$, $H_2O$, $CH_4$, $SO_2$, $H_2S$, $NH_3$, NO, $NO_2$, and $N_2O$, and so on. The maximum temperature for reactive thermal treatment may be, for example, about 300° C. to about 1500° C. The system pressure may also be adjusted to influence the gas atmosphere.

The pyrolysis or other thermal treatment process produces a ceramic part or ceramic matrix composite which may include various ceramic materials such as, but not limited to, SiC, SiOC, $Si_3N_4$, SiON, SiCN, SiOCN, SiBN, SiBCN, BN, or a combination thereof. The composition of the ceramic part or ceramic matrix composite obviously is directly dependent on the composition of the starting 3D-printing monomer formulation as provided in this disclosure. When carbon is desired in the ceramic material, the fraction of carbon may be tailored, for example, by adding phenyl groups on the side chain of the polymer or by using a carbon-based crosslinking agent such as divinyl benzene.

In some embodiments, final ceramic structures are lightweight, strong, and stiff—but can withstand a high-temperature oxidizing environment. The configuration and microstructure of the preceramic polymer determine the composition, microstructure, and yield of the ceramic material after thermal treatment. A high crosslink density is preferred to prevent the fragmentation and loss of low-molecular-mass species, which have not fully converted to either ceramic or escaping gases, during thermal treatment.

During the thermal treatment, whether an inert or reactive thermal treatment technique is employed, gases escape. Gases are formed during the conversion of preceramic polymer to the ceramic structure, by decomposition reactions of the polymer, photoinitiator, free-radical inhibitor, and/or 3D-printing resolution agent. The escaping gases or vapors may include (but are by no means limited to) $CH_4$, $H_2$, CO, $CO_2$, $H_2O$, $SO_2$, $H_2S$, $CH_3S$, etc.

Because various gases escape during pyrolysis or other thermal treatment, the concentration of the solid-phase filler will typically be higher in the final ceramic material, compared to the starting 3D-printing monomer formulation. This is because the solid-phase filler is typically very stable during thermal treatment and does not lose much, if any, mass, while the polymer typically loses a significant amount of mass in pyrolysis (for example, see FIG. 3). Therefore, the concentration of solid-phase filler may be greater than 70 vol % in the final ceramic structure. In various embodiments, the concentration of solid-phase filler is from about 0.1 vol % to about 90 vol %, such as about 0.5, 1, 5, 10, 20, 30, 40, 50, 60, 70, or 80 vol % on the basis of the total ceramic structure following thermal treatment and any post-processing (e.g., washing).

In some variations of this invention, active solid-phase functional additives are employed as the solid-phase fillers. By "solid-phase functional additives" it is meant a material that (a) forms at least one solid phase at 25° C. and 1 atm, and (b) performs or enhances at least one chemical, physical, mechanical, electrical, or magnetic function within the ceramic structure as it is being formed and in the final structure.

Note that solid-phase functional additives are distinguished from the solid-phase fillers disclosed above. Compared to solid-phase fillers, solid-phase functional additives actively improve the final ceramic structure through one or more changes explicitly induced by the additives during pyrolysis or other thermal treatment, as will now be described.

The solid-phase functional additives may be present from about 0.1 vol % and 70 vol % of the monomer formulation, with the majority of the remainder being liquid UV-curable resin. The solid-phase functional additive geometry varies. In some embodiments, the solid-phase functional additives are small particles with average sizes (length or effective diameter) from 5 nanometers to 5 micrometers.

In some embodiments, the solid-phase functional additives actively expand in volume and counteract the shrinkage of the resin, eliminating or reducing the overall shrinkage during conversion of the polymer to ceramic. This addresses a significant shortcoming in the art.

In particular, on conversion from polymer to ceramic, typically about 20-30% linear dimensional shrinkage and about 20-60% mass loss are observed. The shrinkage facilitates cracking and distortion, and limits the achievable part size and tolerances. By introducing active solid-phase functional additives that expand in volume during pyrolysis, the shrinkage of the preceramic polymer is counteracted. The overall shrinkage during conversion of the polymer to ceramic can be reduced or even eliminated.

Note that the solid-phase functional additives are not necessarily stable (unreactive) at pyrolysis temperatures. In many case, it is desired that the functional additives are reactive.

In particular, the solid-phase functional additives may react with the preceramic resin directly on heat treatment. Alternatively, or additionally, the solid-phase functional additives may react with species (e.g., oxygen, nitrogen or carbon) generated from decomposition of the polymer during pyrolysis. Alternatively, or additionally, the solid-phase functional additives may react with the pyrolysis atmosphere during the pyrolysis, for example a nitrogen, methane, or ammonia atmosphere. To counteract the detrimental effects of shrinkage, it is preferred that these reactions happen at the same time as the preceramic resin shrinks, or are effective to reverse the volume reduction.

Examples of solid-phase functional additives for counteracting the shrinkage of the resin include, but are not limited to, scandium, yttrium, titanium, zirconium, zirconium hydride, hafnium, vanadium, niobium, tantalum, chromium, molybdenum, tungsten, manganese, iron, cobalt, nickel, zinc, boron, aluminum, gallium, silicon, germanium, phosphorus, or combinations thereof. Combinations of these elements such as titanium silicide, chromium silicide, magnesium silicide, zirconium silicide, or molybdenum silicide may be used as the solid-phase functional additives. Preferred solid-phase functional additives in this category include aluminum, titanium, zirconium, titanium silicide, chromium silicide, magnesium silicide, and zirconium silicide.

In some embodiments, the solid-phase functional additives actively bind sulfur. For example, the solid-phase functional additives may react with sulfur from thiol groups in the resin and bind the sulfur into stable compounds. One class of preferred UV-curable preceramic resins for 3D printing is based on the thiol-ene reaction (alkene hydrothiolation). The thiol groups contain sulfur which can partially remain in the ceramic after pyrolysis, causing an unpleasant smell. Residual sulfur can also corrode metals.

To mitigate the negative effects of residual sulfur, active solid-phase functional additives may be added that react with the sulfur and bind the sulfur in stable compounds that are neutral in smell and neutral with respect to corrosion of metals. Examples of solid-phase functional additives for binding with sulfur include, but are not limited to, Ti, Zr, Hf, Si, Al, Cr, Nb, $CrSi_2$, $TiSi_2$, or a combination thereof. Preferred sulfur gathering/scavenging solid-phase functional additives are Ti, Zr, and Hf which react to form the stable compounds $Ti_2S_3$, $ZrS_2$, and $HfS_2$, respectively.

In some embodiments, the ceramic structure contains from about 0.01 wt % to about 20 wt % sulfur, such as from about 0.1 wt % to about 10 wt % sulfur. In various embodiments, the ceramic structure contains about 0.1, 0.2, 0.5, 1, 2, 3, 4, 5, 6, 7, 8, 9, 10, 11, 12, 13, 14, or 15 wt % sulfur. Of the sulfur that is present, from about 10 wt % to about 100 wt %, such as about 20, 30, 40, 50, 60, 70, 80, or 90 wt %, may be bound to solid-phase functional additives in stable compounds containing sulfur.

In some embodiments, the solid-phase functional additives actively seed crystallization of a preferred ceramic phase by enabling epitaxial growth of the preferred phase without a nucleation barrier. After pyrolysis of preceramic polymers, an amorphous ceramic is usually obtained. To increase strength and hardness, and reduce high-temperature creep, the amorphous ceramic material needs to then be crystallized into a preferred ceramic phase. This is typically achieved by a long (many hours) heat treatment at temperatures above the pyrolysis temperature, performed right after the pyrolysis or as a distinct second heat treatment.

By contrast, with appropriate solid-phase functional additives in the resin, crystallization may be facilitated by seeding crystallization. Without limitation, the mechanism may include providing a surface for epitaxial growth of the preferred phase or multiple ceramic phases.

For example, the crystallization of β-SiC in an amorphous SiC or SiCN ceramic derived from a polycarbosilane-based or polysilazane-based resin can be facilitated by small (e.g., 1 nanometer to 5 microns) β-SiC crystals. Crystallization of such a resin may be performed at temperatures between 1300° C. and 2800° C. over the course of 5 to 50 hours. Similarly, the crystallization of the α phase or β phase of $Si_3N_4$ in an amorphous $Si_3N_4$ or SiCN ceramic derived from a polysilazane-based resin can be facilitated by small (e.g., 50 nanometers to 5 microns) $\alpha$-$Si_3N_4$ or $\beta$-$Si_3N_4$ crystals, respectively. Other crystals may be chosen to facilitate crystallization, with the typical constraint of epitaxial growth on one crystal facet with low lattice strain.

The ceramic structure may be characterized by at least 50% theoretical density, preferably at least 75% theoretical density, and more preferably at least 95% theoretical density. By "theoretical density" it is meant the actual density of the ceramic structure as a percentage of theoretical density of the material itself, calculated in the absence of porous voids. For example a ceramic structure with absolute density of 2.0 $g/cm^3$, fabricated from a base material with inherent (bulk) density of 2.1 $g/cm^3$, exhibits a theoretical density of 2.0/2.1=95%.

In various embodiments, the ceramic structure is characterized by a theoretical density of about (or at least about) 50%, 60%, 70%, 75%, 80%, 85%, 90%, or 95%. In certain embodiments, without limitation, the ceramic structure is a fully dense monolith, which means that the ceramic structure has at least 99% (e.g., essentially 100%) theoretical density associated with a part or continuous region of material (also referred to as a "monolith"). The absolute density in $g/cm^3$ will vary, depending on the selection of base materials; an exemplary range is about 1 $g/cm^3$ to about 4 $g/cm^3$.

The overall mass loss associated with the conversion of preceramic polymer to the ceramic structure may vary widely, such as from about 1 wt % to about 90 wt %, e.g. about 5, 10, 20, 30, 40, 50, 60, 70, or 80 wt %. The overall mass loss will be dictated by the starting formulation (e.g., fraction organic versus inorganic) as well as by process parameters. In principle, the lost mass may be recovered separately and used for other purposes.

Associated with mass loss may be shrinkage of the preceramic polymer as it converts to the ceramic structure. The linear shrinkage (calculated in a single dimension, such as height of part) may be from 0% to about 60%, for example. Note that the mass loss and shrinkage are not necessarily correlated. In some embodiments with high mass loss, there is not much (if any) shrinkage. These embodiments tend to produce higher porosity and therefore lower densities. In some embodiments with high mass loss, there is substantial shrinkage, unless certain solid-phase fillers are utilized as described above and/or solid-phase functional additives are utilized as described below. These embodiments tend to produce lower porosity, or no porosity, and therefore higher densities (e.g., fully dense ceramic materials). Finally, in some embodiments, there is little mass loss but shrinkage associated with chemical reactions taking place. These embodiments also tend to produce relatively high densities.

Despite shrinkage, if any, the bulk shape (relative geometry) of the preceramic 3D-printed polymer may be preserved in the final ceramic structure. That is, when shrinkage is uniform in all dimensions, the geometrical features are retained in the part: it is a scaled-down version, in all three dimensions. In some embodiments, shrinkage is approximately uniform, which means the geometrical features are basically maintained, with slight deviations. Uniform shrinkage is possible when there is no random fragmentation during conversion of the preceramic polymer to the ceramic structure, and when the reactions and gas escape are isotropic within the material. Note that very small features, such as at the nanoscale, may not be preserved during otherwise uniform shrinkage.

Practically speaking, uniform shrinkage (or no shrinkage, in certain embodiments employing active functional additives) enables the formation of parts that are "net shape" or "near net shape." "Net shape" means that the geometrical features are retained, so that manufactured parts allow final fabrication matching the intended design with little or no post-processing. "Near net shape" means that the geometrical features are not perfectly retained but require only minimal post-processing or hand-work. Both net-shape parts and near-net-shape parts require little or no machining, polishing, bonding, surface finishing, or assembly.

The density of the final ceramic part may vary, as explained above. In general (without limitation), absolute densities ranging from about 0.1 $g/cm^3$ to about 5 $g/cm^3$ may be produced. A fully dense ceramic may have a density from about 1 $g/cm^3$ to about 4 $g/cm^3$, for example.

The strength of the final ceramic material will vary, depending on the initial preceramic resin formulation, as well as the processing parameters. In some embodiments, the final ceramic material is characterized by a Young's Modulus of at least about 200 GPa, 300 GPa, 400 GPa, 500 GPa, or more, measured at 25° C. In some embodiments, the final ceramic material is characterized by a flexural strength of at least about 300 GPa, 400 GPa, 500 GPa, or more, measured at 25° C. In some embodiments, the final ceramic material is characterized by a hardness of at least about 10 GPa, 20 GPa, 30 GPa, or more, measured at 25° C.

The engineering strength of a ceramic part also will depend on the geometry—such as a microtruss produced by some embodiments employing a self-propagating polymer waveguide technique. It is noted that, for instance, silicon oxycarbide microlattice and honeycomb cellular materials fabricated with the present methods exhibit higher strength than ceramic foams of similar density.

The thermal stability of the final ceramic material will vary, depending primarily on the initial preceramic resin formulation, as well as the processing parameters. In various embodiments, the final ceramic material is thermally stable at a temperature of at least 1500° C., 1600° C., 1700° C., 1800° C., 1900° C., or 2000° C. Thermal stability means at least that the ceramic material does melt at these temperatures, and preferably also that the ceramic material does not react (e.g., by oxidation or reduction), undergo thermal shock, or physically decompose (introducing defects) at these temperatures. In some embodiments, for example, the ceramic structure is characterized by being stable in the presence of air at a temperature of about 1000° C., 1100° C., 1200° C., 1300° C., 1400° C., 1500° C., 1600° C., 1700° C., 1800° C., or higher.

The final ceramic structure, even when no machining, polishing, bonding, surface finishing, or assembly is required, may be subjected to coloring (e.g., with inks or dyes), stamping, or other non-functional features, if desired.

EXAMPLES

Example 1: Preparation of 3D-Printing Composition for SiC/SiOC UV-Cured Ceramic Matrix Composite A monomer mixture containing 100 parts of vinylmethoxysiloxane polymer, 100 parts of (mercaptopropyl)methylsiloxane polymer, 0.5 parts of 2,2-dimethyl-2-phenylacetophenone, 0.15 parts of tert-butylhydroquinone, and 0.25 parts of 2,2'-(2,5-thiophenediyl)bis(5-tert-butylbenzoxazole) (all parts by weight), is thoroughly blended to make sure the components are well-mixed and the mixture is a uniform system. This resin is capable of forming a silicon oxycarbide (SiOC) ceramic phase when polymerized and thermally treated.

Then 25% by weight silicon carbide (SiC) powder with 50 μm particle size is blended and sonicated to disperse the SiC particles into the above resin. The SiC microparticles serve as solid-phase fillers in the SiOC-forming resin. The mixture is then ready for use as a monomer formulation in UV-cured 3D printing.

Figure 1B:
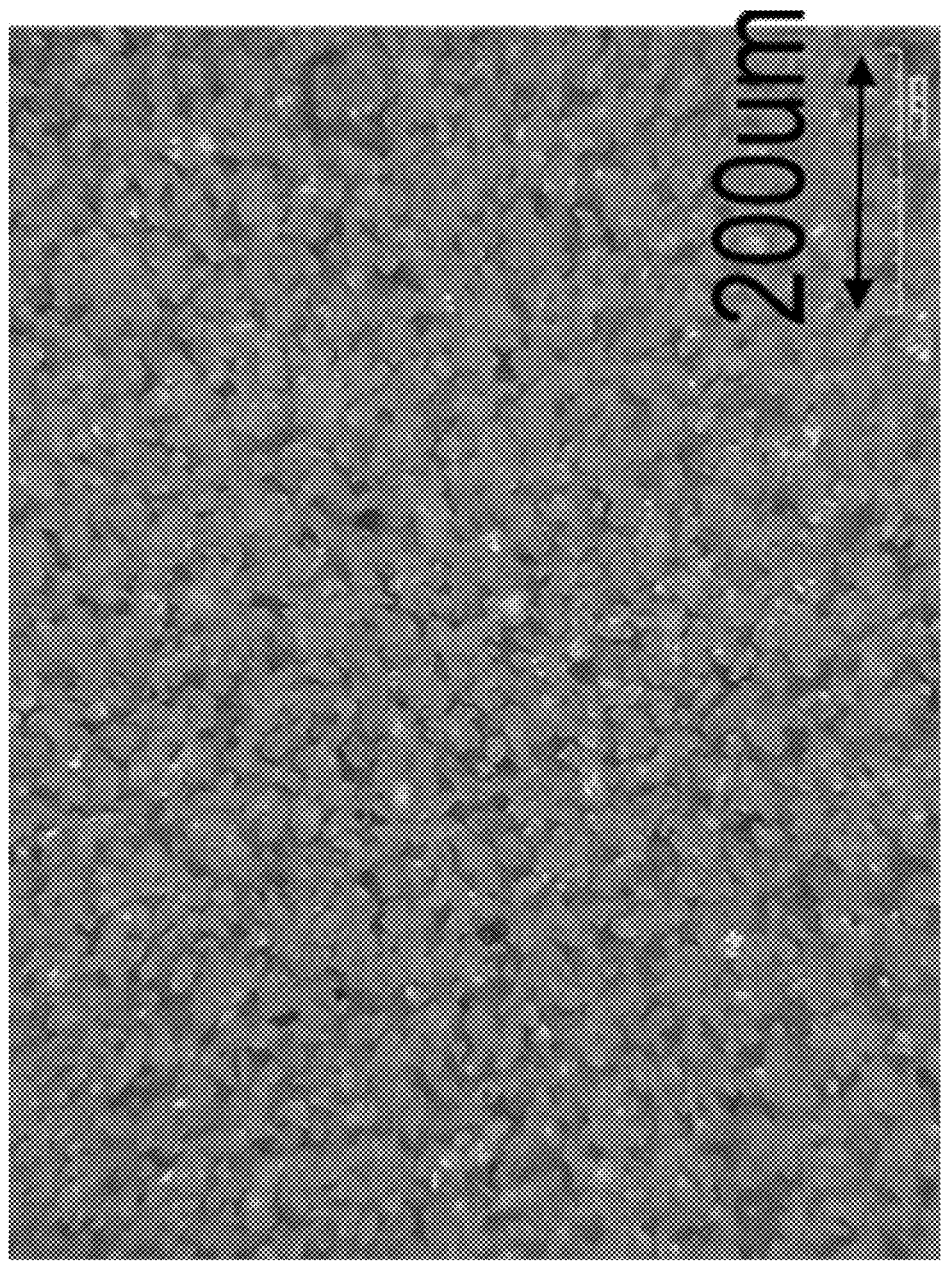
FIG. 1B is an optical microscope image of SiC solid-phase fillers dispersed in a preceramic silicone monomer (scale bar 200 μm), in Example 1.

Optical microscope images of SiC solid-phase fillers dispersed in the preceramic silicone matrix are shown in FIG. 1A (scale bar 500 μm) and FIG. 1B (scale bar 200 μm).

Figure 2:
FIG. 2 is a photograph of a preceramic polymer (right-hand side) and a pyrolyzed ceramic part (left-hand side), in Example 2.

Example 2: Production of 3D-Printed, UV-Cured SiC/SiOC Ceramic Matrix Composite The monomer formulation of Example 1 is 3D-printed and UV-cured, followed by thermal treatment to form a ceramic matrix composite. Bulk parts are demonstrated by curing layers at 385 nm with LED-UV to form a preceramic polymer, and then pyrolyzing the preceramic polymer at 1000° C. in inert atmosphere to form a pyrolyzed ceramic material. FIG. 2 shows a photograph of the preceramic polymer (right-hand side) and the darker pyrolyzed ceramic part (left-hand side).

Figure 3:
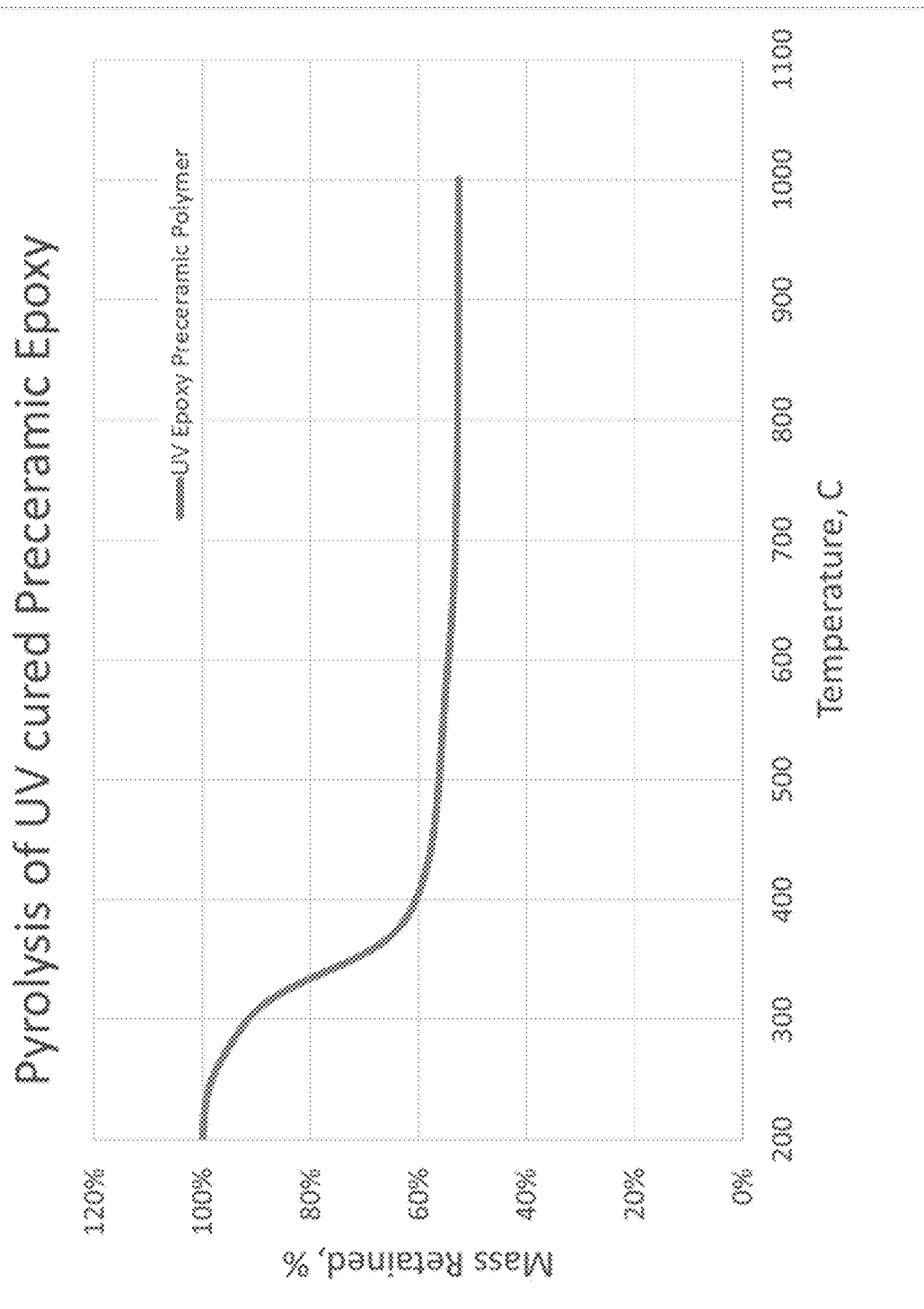
FIG. 3 is a graph of thermogravimetric analysis for the pyrolysis of a UV-cured preceramic polymer into a pyrolyzed ceramic material, measuring the loss of sample mass over time as the pyrolysis temperature increases, in Example 2.

FIG. 3 is a graph of thermogravimetric analysis for the pyrolysis of the UV-cured preceramic polymer into a pyrolyzed ceramic material, measuring the loss of sample mass over time as the pyrolysis temperature increases.

Example 3: Production of Preceramic Polymer Composition Comprising Acrylate-Functionalized Polycarbosilane Allylhydridopolycarbosilane, 77 grams, is combined with acrylic acid, 23 grams, to form a reaction mixture in a container. The reaction mixture is stirred under argon at a reaction temperature from 20° C. to 80° C. for a reaction time from 1 hour to 48 hours (with an inverse correlation between reaction temperature and reaction time). The result of the reaction is a UV-reactive, acrylate-functionalized polycarbosilane preceramic polymer.

A polymerization initiator, such as benzophenone, may be added to the initial reaction mixture or to the acrylate-functionalized polycarbosilane, in a concentration of about 1 wt % to 2 wt %, and stirred until dissolved or suspended.

A free-radical inhibitor, such as hydroquinone, may be added to the initial reaction mixture or to the acrylate-functionalized polycarbosilane, in a concentration of about 0.001 wt % to 1 wt %, and stirred until dissolved or suspended.

A 3D-printing resolution agent, such as 2-(2-hydroxyphenyl)-benzotriazole, may be added to the initial reaction mixture or to the acrylate-functionalized polycarbosilane, in a concentration of about 0.001 wt % to 1 wt %, and stirred until dissolved or suspended.

The UV-reactive, acrylate-functionalized polycarbosilane preceramic polymer may be 3D-printed (e.g., by stereolithography) and thermally treated (e.g., by pyrolysis) to form a 3D ceramic structure containing SiC (and possibly SiOC).

Example 4: Production of Preceramic Polymer Composition Comprising Acrylate-Functionalized Polycarbosilane Allylhydridopolycarbosilane, 35 grams, is combined with allylphenylhydridopolycarbosilane, 35 grams, and stirred to achieve a homogenous initial mixture. The mixing temperature may be from about 20° C. to 80° C. for a mixing time from about 1 minute to 4 hours. The initial mixture is combined with acrylic acid, 30 grams, to form a reaction mixture in a container. The reaction mixture is stirred under argon at a reaction temperature from 20° C. to 80° C. for a reaction time from 1 hour to 48 hours (with an inverse correlation between reaction temperature and reaction time). The result of the reaction is a UV-reactive, acrylate-functionalized polycarbosilane preceramic polymer.

A polymerization initiator, such as 2,2-dimethoxy-2-phenylacetophenone, may be added to the initial reaction mixture or to the acrylate-functionalized polycarbosilane, in a concentration of about 1 wt % to 2 wt %, and stirred until dissolved or suspended.

A free-radical inhibitor, such as methylhydroquinone, may be added to the initial reaction mixture or to the acrylate-functionalized polycarbosilane, in a concentration of about 0.001 wt % to 1 wt %, and stirred until dissolved or suspended.

A 3D-printing resolution agent, such as 2-(2-hydroxyphenyl)-benzotriazole, may be added to the initial reaction mixture or to the acrylate-functionalized polycarbosilane, in a concentration of about 0.001 wt % to 1 wt %, and stirred until dissolved or suspended.

The UV-reactive, acrylate-functionalized polycarbosilane preceramic polymer may be 3D-printed (e.g., by stereolithography) and thermally treated (e.g., by pyrolysis) to form a 3D ceramic structure containing SiC (and possibly SiOC).

Example 5: Production of Preceramic Polymer Composition Comprising Acrylate-Functionalized Polycarbosilane Dry tetrahydrofuran (THF), 300 g, is added to a container and purged with argon. Allylhydridopolycarbosilane, 35 grams, is combined with allylphenylhydridopolycarbosilane, 35 grams, in the container and stirred to achieve a homogenous initial mixture in the container. The mixing temperature may be from about 20° C. to 75° C. for a mixing time from about 1 minute to 4 hours. The initial mixture is combined with acrylic acid, 30 grams, to form a reaction mixture in the container (or transferred to a separate reactor). The reaction mixture is refluxed under argon at 75° C. for a reaction time from 1 hour to 24 hours (with an inverse correlation between reaction temperature and reaction time), with condensation and return of vapors to the reacting mixture. The result of the reflux reaction is a UV-reactive, acrylate-functionalized polycarbosilane preceramic polymer, which may be vacuum-dried.

A polymerization initiator, such as camphorquinone, may be added to the initial reaction mixture or to the acrylate-functionalized polycarbosilane, in a concentration of about 1 wt % to 2 wt %, and stirred until dissolved or suspended.

A free-radical inhibitor, such as ethylhydroquinone, may be added to the initial reaction mixture or to the acrylate-functionalized polycarbosilane, in a concentration of about 0.001 wt % to 1 wt %, and stirred until dissolved or suspended.

A 3D-printing resolution agent, such as 2-hydroxyphenyl-benzophenone, may be added to the initial reaction mixture or to the acrylate-functionalized polycarbosilane, in a concentration of about 0.001 wt % to 1 wt %, and stirred until dissolved or suspended.

The UV-reactive, acrylate-functionalized polycarbosilane preceramic polymer may be 3D-printed (e.g., by stereolithography) and thermally treated (e.g., by pyrolysis) to form a 3D ceramic structure containing SiC (and possibly SiOC).

Example 6: Production of Preceramic Polymer Composition Comprising Acrylate-Functionalized Polycarbosilane Allylhydridopolycarbosilane, 77 grams, is combined with acrylic acid, 23 grams, as well as a crosslinking agent, to form a reaction mixture in a container. A crosslinking agent, divinyl dimethyl silane, 15 grams, is added to the container and stirred to dissolve.

The reaction mixture is stirred under argon at a reaction temperature from 20° C. to 80° C. for a reaction time from 1 hour to 48 hours (with an inverse correlation between reaction temperature and reaction time). The result of the reaction is a UV-reactive, acrylate-functionalized polycarbosilane preceramic polymer.

A polymerization initiator, such as bis(2,4,6-trimethyl-benzoyl)-phenylphosphineoxide, may be added to the initial reaction mixture or to the acrylate-functionalized polycarbosilane, in a concentration of about 1 wt % to 2 wt %, and stirred until dissolved or suspended.

A free-radical inhibitor, such as methoxyhydroquinone, may be added to the initial reaction mixture or to the acrylate-functionalized polycarbosilane, in a concentration of about 0.001 wt % to 1 wt %, and stirred until dissolved or suspended.

A 3D-printing resolution agent, such as 2-hydroxyphenyl-s-triazine, may be added to the initial reaction mixture or to the acrylate-functionalized polycarbosilane, in a concentration of about 0.001 wt % to 1 wt %, and stirred until dissolved or suspended.

The UV-reactive, acrylate-functionalized polycarbosilane preceramic polymer may be 3D-printed (e.g., by stereolithography) and thermally treated (e.g., by pyrolysis) to form a 3D ceramic structure containing SiC (and possibly SiOC).

Example 7: Production of Preceramic Polymer Composition Comprising Acrylate-Functionalized Polycarbonitrosilane Allylhydridopolycarbosilane, 77 grams, is combined with acrylic acid, 23 grams, to form a reaction mixture in a container. A crosslinking agent, 1,3-divinyl-1,1,3,3-tetramethyldisilazane, 15 grams, is added to the container and stirred to dissolve.

The reaction mixture is stirred under argon at a reaction temperature from 20° C. to 80° C. for a reaction time from 1 hour to 48 hours (with an inverse correlation between reaction temperature and reaction time). The result of the reaction is a UV-reactive, acrylate-functionalized polycarbonitrosilane preceramic polymer.

A polymerization initiator, such as benzophenone, may be added to the initial reaction mixture or to the acrylate-functionalized polycarbonitrosilane, in a concentration of about 1 wt % to 2 wt %, and stirred until dissolved or suspended.

A free-radical inhibitor, such as hydroquinone, may be added to the initial reaction mixture or to the acrylate-functionalized polycarbonitrosilane, in a concentration of about 0.001 wt % to 1 wt %, and stirred until dissolved or suspended.

A 3D-printing resolution agent, such as 2-(2-hydroxyphenyl)-benzotriazole, may be added to the initial reaction mixture or to the acrylate-functionalized polycarbonitrosilane, in a concentration of about 0.001 wt % to 1 wt %, and stirred until dissolved or suspended.

The UV-reactive, acrylate-functionalized polycarbonitrosilane preceramic polymer may be 3D-printed (e.g., by stereolithography) and thermally treated (e.g., by pyrolysis) to form a 3D ceramic structure containing SiCN (and possibly SiOCN).

Example 8: Production of Preceramic Polymer Composition Comprising Acrylate-Functionalized Polycarbonitrosilane Allylhydridopolycarbosilane, 77 grams, is combined with acrylic acid, 23 grams, to form a first reaction mixture in a first container. A crosslinking agent, divinyl dimethyl silane, 15 grams, is added to the first container and stirred to dissolve.

The first reaction mixture is stirred under argon at a first-container reaction temperature from 20° C. to 80° C. for a first-container reaction time from 1 hour to 48 hours (with an inverse correlation between reaction temperature and reaction time).

In a second container, polycarbosilazane is stirred under argon. To the second container, 2-isocyanatoethylacrylate is added and the second mixture is stirred under argon. The second-container reaction temperature may be from about 0° C. to 50° C. for a second-container reaction time from about 1 hour to 48 hours.

The contents of the second containers are added to the first container, and stirred until dissolved. An additional reaction time may be provided, from about 1 hour to 24 hours, at a reaction temperature may be from about 0° C. to 80° C. The result of the reaction is a UV-reactive, acrylate-functionalized polycarbonitrosilane preceramic polymer.

A polymerization initiator, such as benzophenone, may be added to the initial reaction mixture or to the acrylate-functionalized polycarbonitrosilane, in a concentration of about 1 wt % to 2 wt %, and stirred until dissolved or suspended.

A free-radical inhibitor, such as hydroquinone, may be added to the initial reaction mixture or to the acrylate-functionalized polycarbonitrosilane, in a concentration of about 0.001 wt % to 1 wt %, and stirred until dissolved or suspended.

A 3D-printing resolution agent, such as 2-(2-hydroxyphenyl)-benzotriazole, may be added to the initial reaction mixture or to the acrylate-functionalized polycarbonitrosilane, in a concentration of about 0.001 wt % to 1 wt %, and stirred until dissolved or suspended.

The UV-reactive, acrylate-functionalized polycarbonitrosilane preceramic polymer may be 3D-printed (e.g., by stereolithography) and thermally treated (e.g., by pyrolysis) to form a 3D ceramic structure containing SiCN (and possibly SiOCN).

Figure 4:
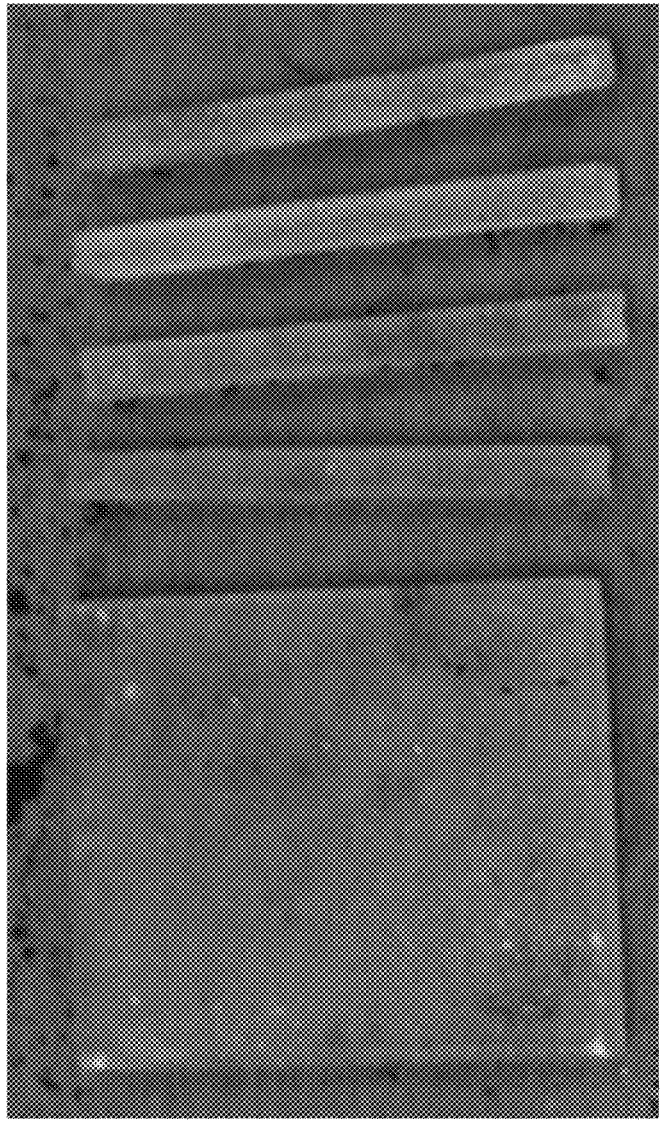
FIG. 4 is a photograph of a 3D-printed polymer plate and 3D-printed polymer bars, in Example 9.
Figure 6:
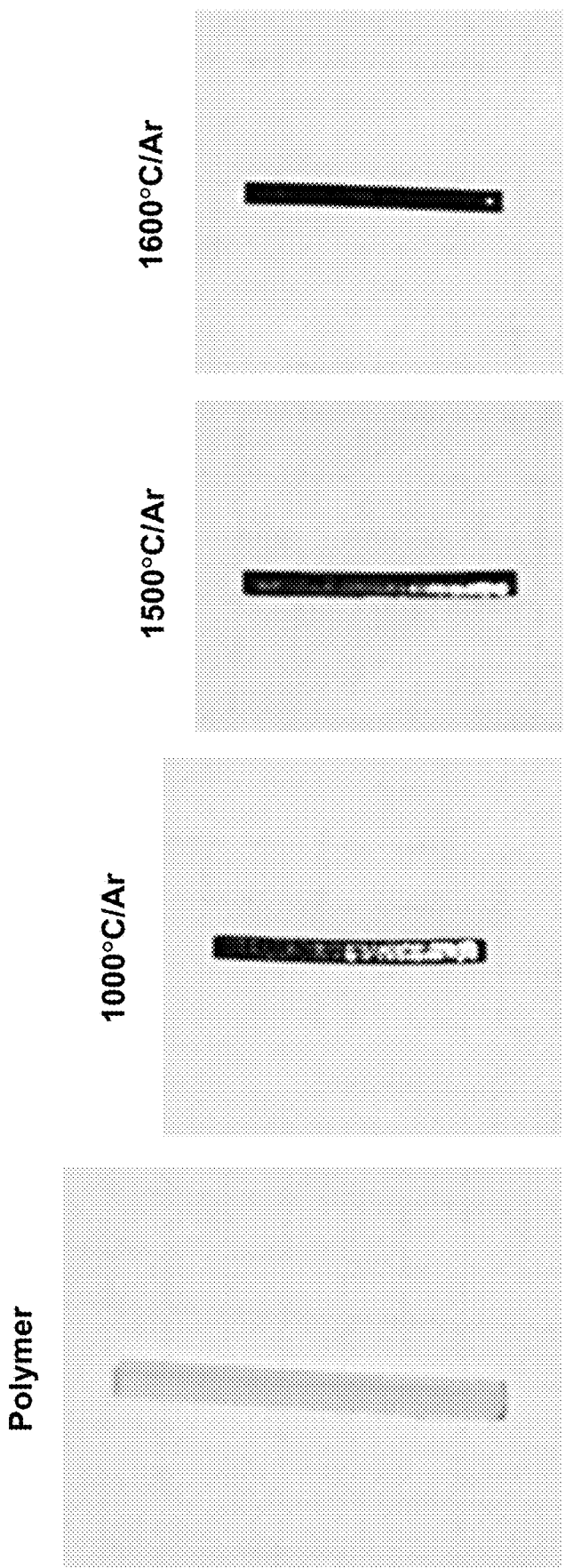
FIG. 6 is a photograph of a 3D-printed polymer bar, an amorphous SiC bar, and SiC bars crystallized at 1500° C. and 1600° C., in Example 9.

Example 9: Production of 3D-Printed SiC from Acrylate-Functionalized Polycarbosilane The UV-reactive, acrylate-functionalized polycarbosilane preceramic polymer of Example 4 is 3D-printed into a plate and bars using a UV-based digital light projection 3D printer, Prodways L5000, following a top-down printing technique. The resin is filled into a vat. A mobile print platform is initially set at one-print-layer thickness, about 50 micron, below the resin surface. Via a scanning mirror, a UV beam is selectively projected onto the resin. The final 3D part is printed layer by layer of cross-section images as the print platform moves downward. FIG. 4 is a photograph of the 3D-printed polymer plate and bars. FIG. 6 also shows a 3D-printed polymer bar (image on left-hand side).

Figure 5:
FIG. 5 is a photograph of an amorphous SiC plate and amorphous SiC bars, in Example 9.

The 3D-printed preceramic polymer is then converted to an amorphous SiC ceramic material via pyrolysis at a temperature of 1000° C. for 1 hour under an atmosphere of argon. FIG. 5 is a photograph of the amorphous SiC plate and bars. FIG. 6 also shows an amorphous ceramic bar (second image from left).

In one experiment, the amorphous SiC ceramic material is subjected to high-temperature crystallization at a temperature of 1500° C. for 4 hours. In another experiment, the amorphous SiC ceramic material is subjected to high-temperature crystallization at a temperature of 1600° C. for 4 hours. FIG. 6 is a photograph of the crystallized SiC bars at 1500° C. (third image from left) and 1600° C. (image on right-hand side). It is observed that the 3D-printed and pyrolyzed bars survive high-temperature crystallization.

Figure 7:
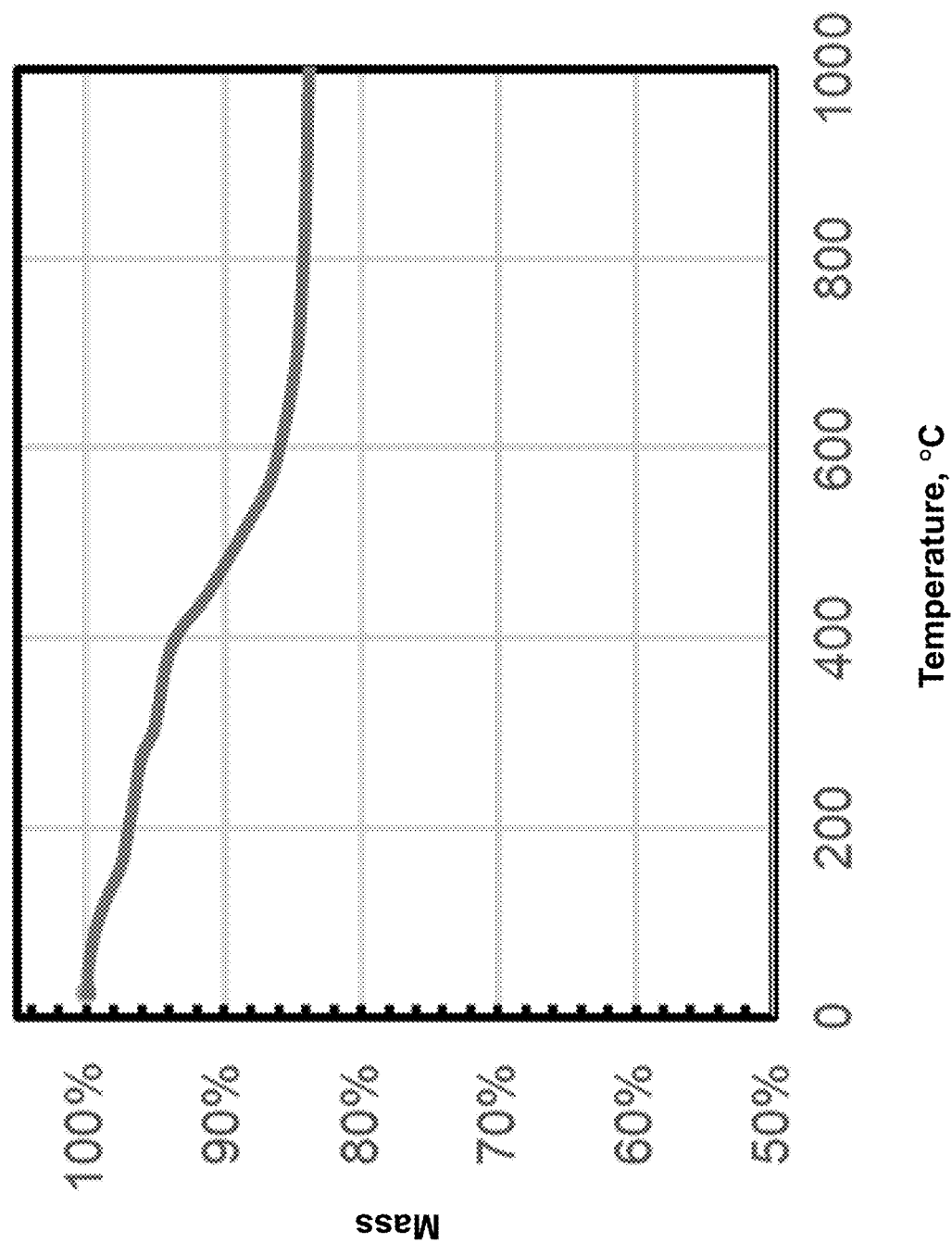
FIG. 7 is a graph of thermogravimetric weight loss associated with a preceramic polymer as it is pyrolyzed up to 1000° C., in Example 9.
Figure 8:
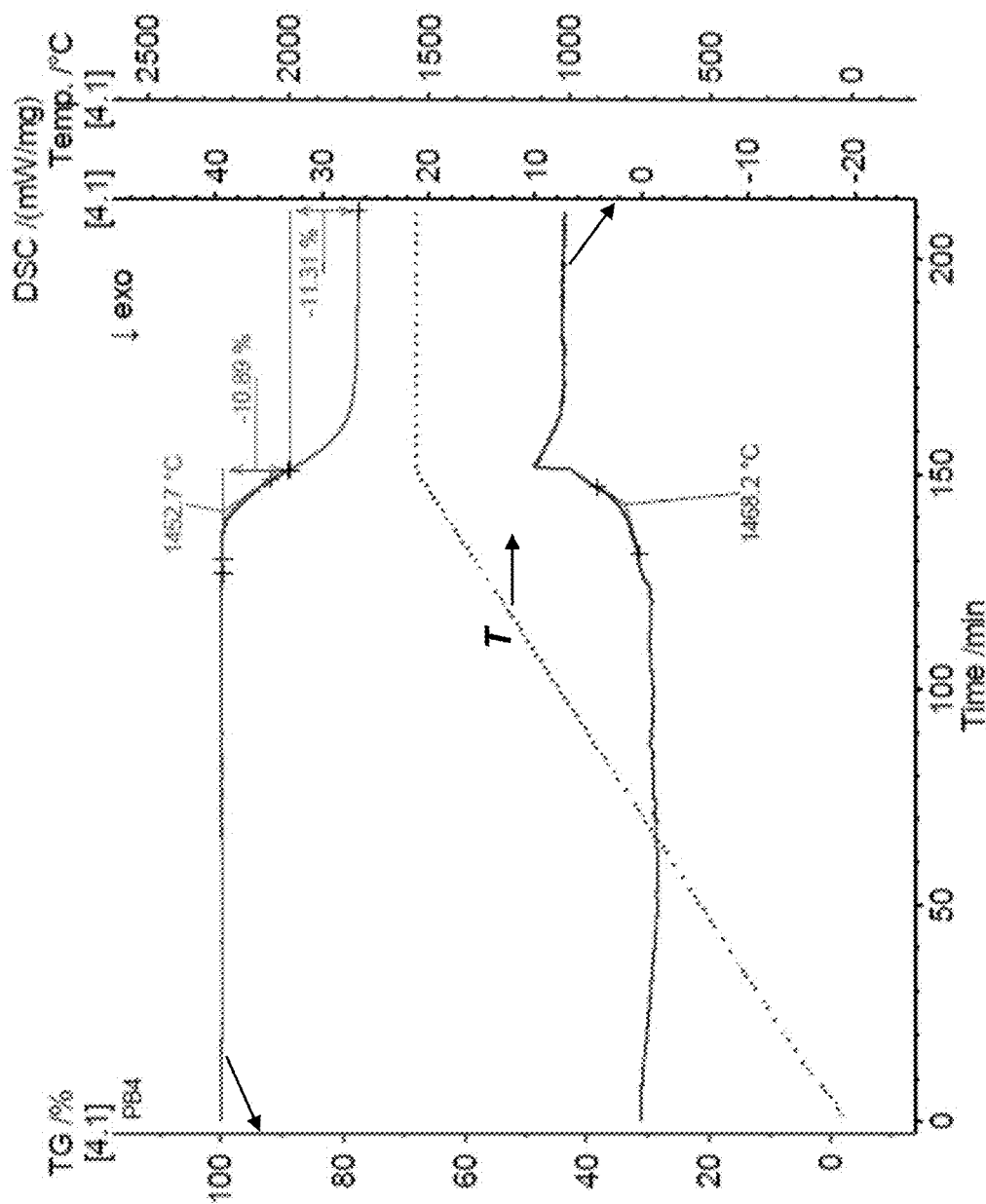
FIG. 8 is a graph of thermogravimetric (TG) weight loss and differential scanning calorimetry (DSC) associated with a preceramic polymer as it is pyrolyzed up to 1000° C. and then further thermally treated to 1500° C., in Example 9.

Thermogravimetric analysis of the preceramic polymer as it is pyrolyzed up to 1000° C., and then further thermally treated to 1500° C., is shown in FIGS. 7 and 8.

Figure 9:
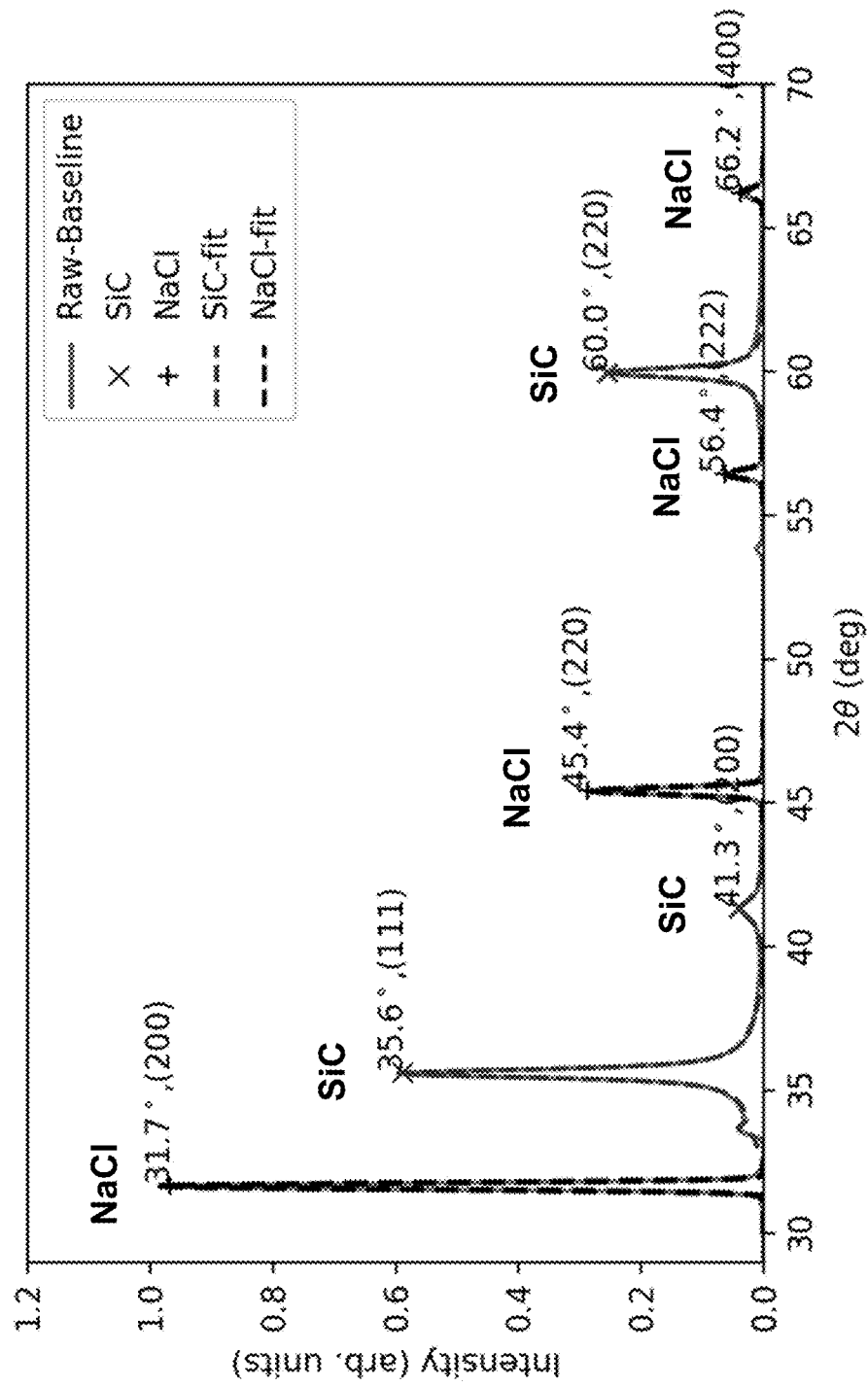
FIG. 9 shows an X-ray powder diffraction pattern of the ceramic material obtained from high-temperature treatment at 1600° C. for 4 hours in argon, revealing the β-SiC phase in the crystallized ceramic material, in Example 9.

FIG. 9 shows the X-ray powder diffraction pattern of the ceramic material obtained from high-temperature treatment at 1600° C. for 4 hours in argon. The X-ray powder diffraction pattern reveals the β-SiC phase present in the crystallized ceramic material.

The versatility and the applications of these preceramic resin formulations make them especially useful. A variety of applications in the automotive and aerospace industries, among others, may benefit from the ability to 3D-print high-strength and high-temperature ceramic structures which can be derived from the disclosed formulations. These ceramic 3D parts or materials may be used for lightweight, high-temperature structural applications or for other applications that utilize the unique microstructures, such as (but not limited to) jet engine nozzles, nose cones, catalyst support, engine components, and microelectromechanical systems and devices.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:
1. A preceramic resin formulation for 3D-printing and free-radical or cationic polymerization, said preceramic resin formulation comprising:
   (a) a functionalized carbosilane having the chemical structure:

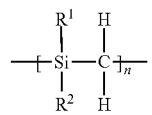

wherein:
   $R^1$ is selected from the group consisting of an allyl group, an ethynyl group a vinyl ether group, a glycidyl group, a glycidyl ether group, a vinyl glycidyl ether group, a vinyl amide group, a vinyl triazine group, a vinyl isocyanurate group, a cyano group, a cyanate group, a thiocyanate group, and combinations thereof;
   $R^2$ is selected from the group consisting of an allyl group, an ethynyl group a vinyl ether group, a glycidyl group, a glycidyl ether group, a vinyl glycidyl ether group, a vinyl amide group, a vinyl triazine group, a vinyl isocyanurate group, a cyano group, a cyanate group, and combinations thereof; and
   n=2 to 100;
   (b) a photoinitiator;
   (c) a free-radical inhibitor; and
   (d) a 3D-printing resolution agent, wherein said 3D-printing resolution agent is selected for its capability to improve 3D-print quality and resolution by containing curing to a desired region of light exposure laterally and/or vertically in a pre-cured print bath via absorbing said light at a first wavelength and converting energy produced therefrom into thermal energy or radiation at a higher wavelength.

2. The preceramic resin formulation of claim 1, wherein at least one of $R^1$ or $R^2$ is an allyl group.

3. The preceramic resin formulation of claim 1, wherein said preceramic resin formulation contains at least two distinct functionalized carbosilanes that are each in accordance with said chemical structure, wherein $R^1$, $R^2$, and n are independently selected for said distinct functionalized carbosilanes.

4. The preceramic resin formulation of claim 1, wherein said photoinitiator is present in a concentration from about 0.001 wt % to about 10 wt % in said preceramic monomer formulation.

5. The preceramic resin formulation of claim 1, wherein said free-radical inhibitor is present in a concentration from about 0.001 wt % to about 10 wt % in said preceramic monomer formulation.

6. The preceramic resin formulation of claim 1, wherein said 3D-printing resolution agent is present in a concentration from about 0.001 wt % to about 10 wt % in said preceramic resin formulation.

7. The preceramic resin formulation of claim 1, wherein said preceramic monomer formulation further comprises a thermal free-radical initiator.

8. The preceramic resin formulation of claim 1, wherein said preceramic resin formulation further contains a crosslinking agent.

9. The preceramic resin formulation of claim 1, wherein said preceramic monomer formulation further comprises from about 0.1 vol % to about 70 vol % of solid-phase fillers.

10. The preceramic resin formulation of claim 1, wherein said 3D-printing resolution agent is selected from the group consisting of 2-hydroxyphenyl-benzophenones, 2-hydroxyphenyl-s-triazines, 2,2'-(2,5-thiophenediyl)bis(5-tert-butylbenzoxazole), 2,2'-(1,2-ethenediyl)bis(4,1-phenylene)bis-benzoxazole, and combinations thereof.

* * * * *